United States Patent
Mueller et al.

(10) Patent No.: US 9,540,765 B2
(45) Date of Patent: Jan. 10, 2017

(54) MIXTURES OF REACTIVE DYES AND THEIR USE IN A METHOD OF DI- OR TRICHROMATIC DYEING OR PRINTING

(71) Applicant: HUNTSMAN ADVANCED MATERIALS (SWITZERLAND) GMBH, Basel (CH)

(72) Inventors: Alexander Mueller, Weil am Rhein (DE); Rainer Hildebrand, Lorrach (DE); Sandra Da Silva Saraiva, Gontenschwil (CH); Wolfgang Mundle, Weil am Rhein (DE); Markus Kneubuehler, Allschwil (CH)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 14/762,253

(22) PCT Filed: Feb. 5, 2014

(86) PCT No.: PCT/EP2014/052196
§ 371 (c)(1),
(2) Date: Jul. 21, 2015

(87) PCT Pub. No.: WO2014/127994
PCT Pub. Date: Aug. 28, 2014

(65) Prior Publication Data
US 2015/0354134 A1 Dec. 10, 2015

(30) Foreign Application Priority Data
Feb. 19, 2013 (EP) ..................... 13155811

(51) Int. Cl.
C09B 62/00 (2006.01)
D06P 1/00 (2006.01)
(Continued)

(52) U.S. Cl.
CPC ......... D06P 1/0096 (2013.01); C09B 29/3604 (2013.01); C09B 45/485 (2013.01);
(Continued)

(58) Field of Classification Search
CPC ............. C09B 67/0042; C09B 29/3604; C09B 45/485; C09B 67/0052; C09B 67/0047; D06P 1/0096
(Continued)

(56) References Cited

U.S. PATENT DOCUMENTS

2006/0185103 A1* 8/2006 Cho ................... C09B 62/4413
8/549

FOREIGN PATENT DOCUMENTS

EP 0 437 184 7/1991
EP 0 525 805 2/1993
(Continued)

OTHER PUBLICATIONS

STIC Search Report dated Dec. 29, 2015.*

Primary Examiner — Eisa Elhilo
(74) Attorney, Agent, or Firm — Huntsman International LLC

(57) ABSTRACT

A dye mixture, comprising at least one blue dyeing dye of the formula (1), wherein $Q_1$ represents a bivalent radical of formula (4a), (4b) or (4c), wherein $X_1$ denotes chlorine or fluorine, $R_1$ is hydrogen or $C_1$-$C_8$ alkyl, $R_2$ is hydrogen, $C_1$-$C_8$alkyl, $C_1$-$C_4$alkoxy or sulfo, $Y_1$ is vinyl or a radical —$CH_2$—$CH_2$—U and U is a leaving group removable under alkaline conditions, $R_3$ is hydrogen or $C_1$-$C_8$alkyl that is unsubstituted or substituted by hydroxy, sulfo, sulfato, cyano, carboxy, $C_1$-$C_4$alkoxy or phenyl, r and s are each independently of the other the number 0 or 1, and t is the number 0, 1 or 2, and the sum of r, s and t is 2 or 3 and at least one yellow or red dyeing reactive dye is suitable especially for the dichromatic or trichromatic dyeing or printing of natural or synthetic polyamide fibre materials and yield dyeings or prints having good reproducibility and good all-round fastness properties.

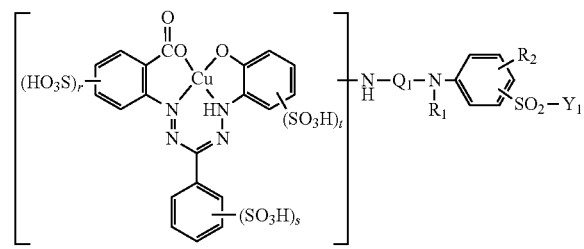

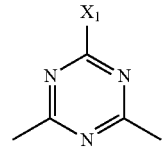

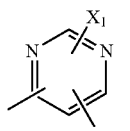

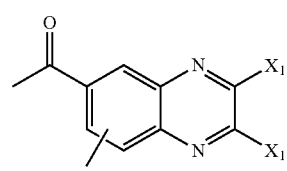

8 Claims, No Drawings

(51) Int. Cl.
*C09B 45/48* (2006.01)
*C09B 29/36* (2006.01)
*C09B 67/22* (2006.01)

(52) U.S. Cl.
CPC ...... *C09B 67/0042* (2013.01); *C09B 67/0047* (2013.01); *C09B 67/0052* (2013.01)

(58) Field of Classification Search
USPC .......................................................... 8/549
See application file for complete search history.

(56) References Cited

FOREIGN PATENT DOCUMENTS

| | | |
|---|---|---|
| EP | 0 644 240 | 3/1995 |
| EP | 0 775 731 | 5/1997 |
| WO | 2005/040285 | 5/2005 |

* cited by examiner

MIXTURES OF REACTIVE DYES AND THEIR USE IN A METHOD OF DI- OR TRICHROMATIC DYEING OR PRINTING

CROSS REFERENCE TO RELATED APPLICATIONS

This application is the National Phase of International Application PCT/EP2014/052196 filed Feb. 5, 2014, which designated the U.S. and which claims priority to European Patent Application (EP) 13155811.6 filed Feb. 19, 2013. The noted applications are incorporated herein by reference.

The present invention relates to mixtures of reactive dyes that are suitable for the dyeing or printing of nitrogen-containing or hydroxy-group-containing fibre materials and yield on such materials dyeings or prints having good reproducibility and good all-round fastness properties. The present invention relates also to a method for dichromatic or trichromatic dyeing or printing wherein the reactive dye mixtures according to the invention are used.

Natural or synthetic polyamide fibres can be dyed or printed by using dichromatic or trichromatic mixtures of reactive dyes and metal complex dyes.

The practice of dyeing with reactive dyes has recently led to increased requirements regarding the quality of the dyeings and the profitability of the dyeing process.

Consequently, there continues to be a demand for novel reactive dye mixtures which have improved properties, in particular in respect of application.

Reactive dye mixtures which have a high degree of exhaustion and a high degree of fixing, and which, in particular, do not require alkaline after-treatment to remove non-fixed dye, are now required for dyeing. They should furthermore have a good dyeing yield, high reactivity and good levelness in combination. These requirements are not met in all properties by the known dye mixtures.

The present invention is therefore based on the object of discovering improved reactive dye mixtures for dyeing and printing fibre materials, which have the qualities characterized above to a high degree. In particular, the novel dye mixtures should be distinguished by high degrees of exhaustion, high fixing yields and high fibre-dye bond stabilities. They should furthermore produce dyeings with good all-round properties, for example light and wet fastness properties.

It has been found that the object described is largely achieved with the reactive dye mixtures defined below. The dyeings and printings obtained are distinguished especially by uniform colour build-up and, at the same time, constancy of shade at different concentrations, and by good combinability, and exhibit good fibre levelness and no dichroism.

The invention relates to a dye mixture, comprising at least one blue dyeing dye of the formula

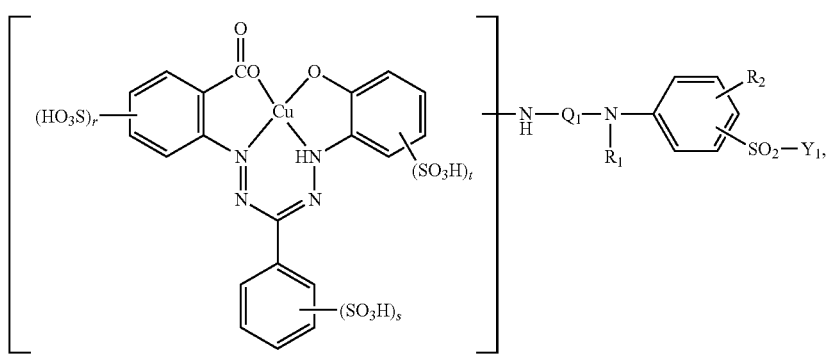

and at least one yellow or red dyeing dye from the group of the formulae

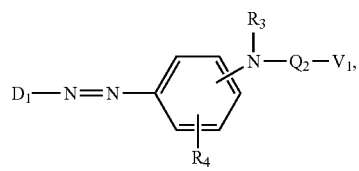

(2)

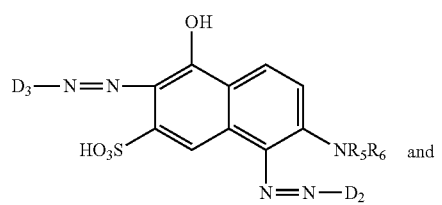

(3a)

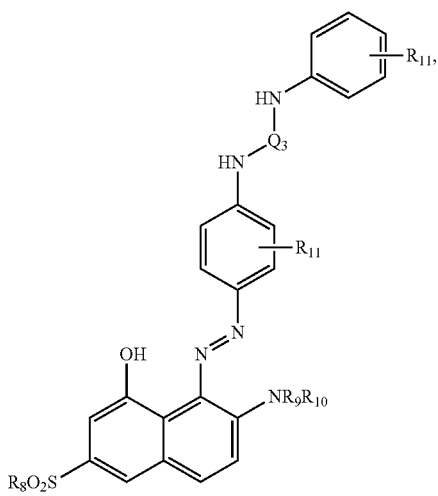

(3b)

wherein
$Q_1$, $Q_2$ and $Q_3$ represent each independently of the other a bivalent radical of formula

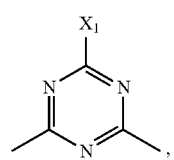

(4a)

(1)

-continued

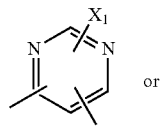
(4b)

or

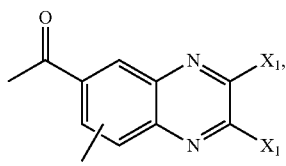
(4c)

wherein $X_1$ denotes chlorine or fluorine, $R_1$ is hydrogen or $C_1$-$C_8$alkyl, $R_2$ is hydrogen, $C_1$-$C_8$alkyl, $C_1$-$C_4$alkoxy or sulfo, $Y_1$ is vinyl or a radical —$CH_2$—$CH_2$—U and U is a leaving group removable under alkaline conditions, $R_3$ is hydrogen or $C_1$-$C_8$alkyl that is unsubstituted or substituted by hydroxy, sulfo, sulfato, cyano, carboxy, $C_1$-$C_4$alkoxy or phenyl, $R_4$ is hydrogen, $C_1$-$C_8$alkyl, $C_1$-$C_4$alkoxy, $C_2$-$C_4$alkanoylamino, ureido, halogen or sulfo, $V_1$ is a radical of the formula

(5a)

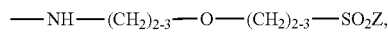
(5b)

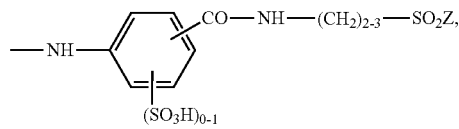
(5c)

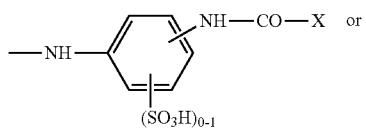
(5d)

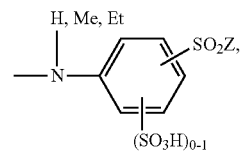
(5e)

in which

Z is vinyl or a radical —$CH_2$—$CH_2$—U and U is a leaving group removable under alkaline conditions, X is the radical

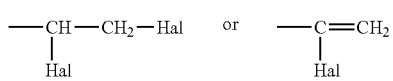

and Hal is halogen, and $D_1$ is a radical of the formula

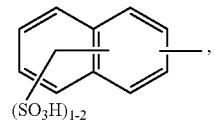
(6)

$R_5$ and $R_6$ are each independently of the other hydrogen or $C_1$-$C_8$alkyl that is unsubstituted or substituted by hydroxy, sulfo, sulfato, cyano, carboxy, $C_1$-$C_4$alkoxy or phenyl, $D_2$ and $D_3$ are each independently of the other the radical of a diazo component of the benzene or naphthalene series, $R_8$ is hydroxyl or —$NR_{12}R_{13}$, $R_9$ and $R_{10}$ are each independently of the other hydrogen or $C_1$-$C_8$alkyl that is unsubstituted or substituted by hydroxy, sulfo, sulfato, cyano, carboxy, $C_1$-$C_4$alkoxy or phenyl, $R_{11}$ is hydrogen, $C_1$-$C_8$alkyl, $C_1$-$C_4$alkoxy or sulfo, $R_{12}$ and $R_{13}$ are each independently of the other hydrogen or $C_1$-$C_8$alkyl that is unsubstituted or substituted by hydroxy, sulfo, sulfato, cyano, carboxy, $C_1$-$C_4$alkoxy or phenyl, $V_2$ is —$SO_2Y_2$ or a radical of the formulae (5a)-(5e) as defined above, $Y_2$ is vinyl or a radical —$CH_2$—$CH_2$—U and U is a leaving group removable under alkaline conditions, r and s are each independently of the other the number 0 or 1, and t is the number 0, 1 or 2, and the sum of r, s and t is 2 or 3.

As $C_1$-$C_8$alkyl or there come into consideration for $R_1$, $R_2$, $R_3$, $R_4$, $R_5$, $R_6$, $R_8$, $R_9$, $R_{10}$, $R_{11}$, $R_{12}$ and $R_{13}$, each independently of the others, for example, methyl, ethyl, propyl, isopropyl, n-butyl, sec-butyl, isobutyl, tert-butyl, n-pentyl, neopentyl, n-hexyl, n-heptyl, n-octyl and isooctyl, preferably methyl and ethyl and especially methyl.

As $C_1$-$C_4$alkoxy there come into consideration for $R_2$ and $R_4$, each independently of the others, for example, methoxy, ethoxy, n-propoxy, isopropoxy, n-butoxy and isobutoxy, preferably methoxy and ethoxy and especially methoxy.

As $C_2$-$C_4$alkanoylamino there come into consideration for $R_4$, for example, acetylamino, propionylamino and butyrylamino, preferably acetylamino and propionylamino and especially acetylamino.

As halogen there come into consideration for $R_4$, for example, fluorine, chlorine and bromine, preferably chlorine and bromine and especially chlorine.

For $X_1$ there come into consideration, for example, fluorine, chlorine and bromine, preferably fluorine and chlorine and especially chlorine.

As the leaving group U there come into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$-$C_4$alkyl and —$OSO_2$—N($C_1$-$C_4$alkyl)$_2$. Preferably, U is a group of formula —Cl, —$OSO_3H$, —$SSO_3H$, —OCO—$CH_3$, —OCO—$C_6H_5$ or —$OPO_3H_2$, especially —Cl or —$OSO_3H$ and more especially —$OSO_3H$.

Examples of suitable radicals Z, $Y_1$ and $Y_2$ are accordingly vinyl, β-bromo- or β-chloroethyl, β-acetoxyethyl, β-benzoyloxyethyl, β-phosphatoethyl, β-sulfatoethyl and β-thiosulfatoethyl.

Preferably, Z, $Y_1$ and $Y_2$ are independently vinyl, β-chloroethyl or β-sulfatoethyl, especially vinyl or β-sulfatoethyl.

In the radical of formula (5e), Me is the methyl radical and Et is the ethyl radical. The mentioned radicals come into consideration, besides hydrogen, as substituents at the nitrogen atom.

The radicals $D_2$ and $D_3$ in the dyes of formula (3a) may contain the substituents that are customary for azo dyes.

From the range of substituents there may be mentioned by way of example: alkyl groups having from 1 to 12 carbon atoms, especially from 1 to 4 carbon atoms, such as methyl, ethyl, n- or iso-propyl, or n-, iso-, sec- or tert-butyl; alkoxy groups having from 1 to 8 carbon atoms, especially from 1 to 4 carbon atoms, such as methoxy, ethoxy, n- or iso-propoxy, or n-, iso-, sec- or tert-butoxy; $C_1$-$C_4$alkoxy substituted in the alkyl moiety, for example by hydroxy, $C_1$-$C_4$alkoxy or sulfato, e.g. 2-hydroxyethoxy, 3-hydroxypropoxy, 2-sulfatoethoxy, 2-methoxyethoxy or 2-ethoxyethoxy; alkanoylamino groups having from 2 to 8 carbon atoms, especially $C_2$-$C_4$alkanoylamino groups, such as acetylamino or propionylamino; benzoyl-amino or $C_2$-$C_4$alkoxycarbonylamino groups, such as methoxycarbonylamino or ethoxy-carbonylamino; amino; N-mono- or N,N-di-$C_1$-$C_4$alkylamino which is unsubstituted or is substituted in the alkyl moiety, for example by hydroxy, sulfo, sulfato or $C_1$-$C_4$alkoxy, e.g. methylamino, ethylamino, N,N-dimethyl- or N,N-diethylamino, sulfomethylamino, β-hydroxy-ethylamino, N,N-di(β-hydroxyethylamino), N-β-sulfatoethylamino; phenylamino which is unsubstituted or is substituted in the phenyl moiety by methyl, methoxy, halogen or sulfo; N—$C_1$-$C_4$alkyl-N-phenylamino which is unsubstituted or is substituted in the alkyl moiety by hydroxy, sulfo or sulfato or in the phenyl moiety by methyl, methoxy, halogen or sulfo, e.g. N-methyl-N-phenylamino, N-ethyl-N-phenylamino, N-β-hydroxyethyl-N-phenylamino or N-β-sulfoethyl-N-phenylamino; naphthylamino which is unsubstituted or is substituted by sulfo; alkanoyl groups having from 2 to 8 carbon atoms, especially from 2 to 4 carbon atoms, for example acetyl or propionyl; benzoyl; alkoxycarbonyl having from 1 to 4 carbon atoms in the alkoxy radical, such as methoxycarbonyl or ethoxycarbonyl; alkylsulfonyl having from 1 to 4 carbon atoms, such as methylsulfonyl or ethylsulfonyl; phenyl- or naphthyl-sulfonyl; trifluoro-methyl, nitro, cyano, hydroxy, halogen, such as fluorine, chlorine or bromine; carbamoyl, N—$C_1$-$C_4$alkylcarbamoyl, such as N-methylcarbamoyl or N-ethylcarbamoyl; sulfamoyl, N—$C_1$-$C_4$-alkylsulfamoyl, such as N-methylsulfamoyl, N-ethylsulfamoyl, N-propylsulfamoyl, N-isopropyl-sulfamoyl or N-butylsulfamoyl; N-(β-hydroxyethyl)-sulfamoyl, N,N-di(β-hydroxyethyl)sulfamoyl, N-phenylsulfamoyl, ureido, carboxy, sulfomethyl, sulfo or sulfato as well as fibre-reactive radicals. The alkyl radicals may, in addition, be interrupted by oxygen (—O—) or by an amino group (—NH—, —N($C_1$-$C_4$alkyl)-).

In one embodiment of the present invention that is of interest, at least one of the radicals $D_2$ and $D_3$ carries at least one fibre-reactive group.

In another embodiment of the present invention that is of interest, each of the radicals $D_2$ and $D_3$ carries at least one fibre-reactive group.

Fibre-reactive radicals are to be understood as being those that are capable of reacting with the hydroxy groups of cellulose, with the amino, carboxy, hydroxy and thiol groups in wool and silk, or with the amino and possibly the carboxy groups of synthetic polyamides to form covalent chemical bonds. The fibre-reactive radicals are generally bonded to the dye radical directly or via a bridging member. Suitable fibre-reactive radicals are, for example, those having at least one removable substituent on an aliphatic, aromatic or heterocyclic radical, or those wherein the mentioned radicals contain a radical suitable for reaction with the fibre material, such as, for example, a vinyl radical.

Such fibre-reactive radicals are known per se and a large number of them have been described, for example in Venkataraman "*The Chemistry of Synthetic Dyes*" Volume 6, pages 1-209, Academic Press, New York, London 1972 or in U.S. Pat. No. 5,684,138.

Preferably, the mixtures according to the invention contain at least one dye of the formula

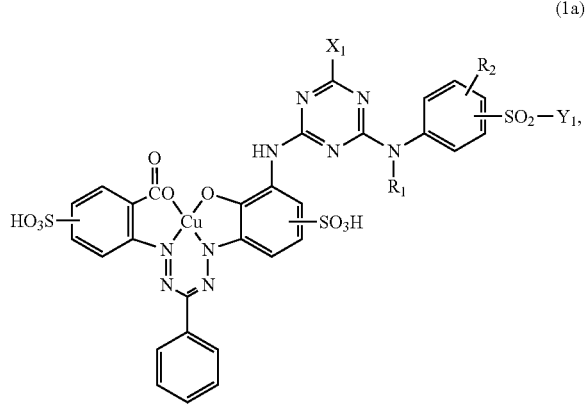

(1a)

wherein $R_1$, $R_2$, $X_1$ and $Y_1$ are as defined in claim 1.

The dye of formula (1) is, for example, a dye of formula

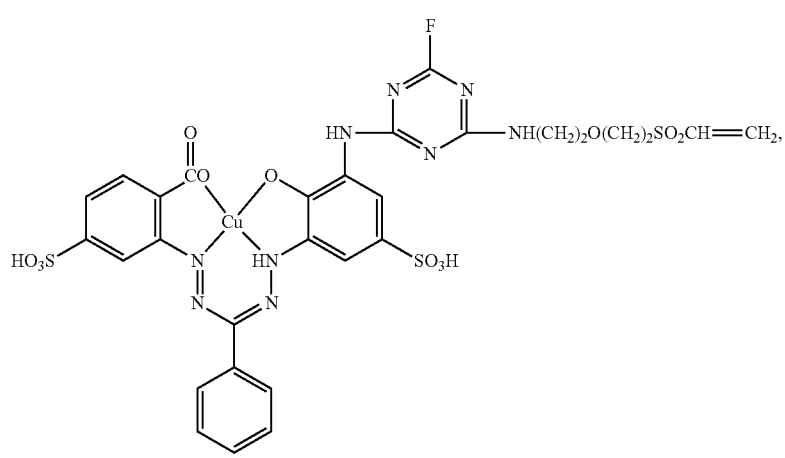

(101)

-continued
(102)
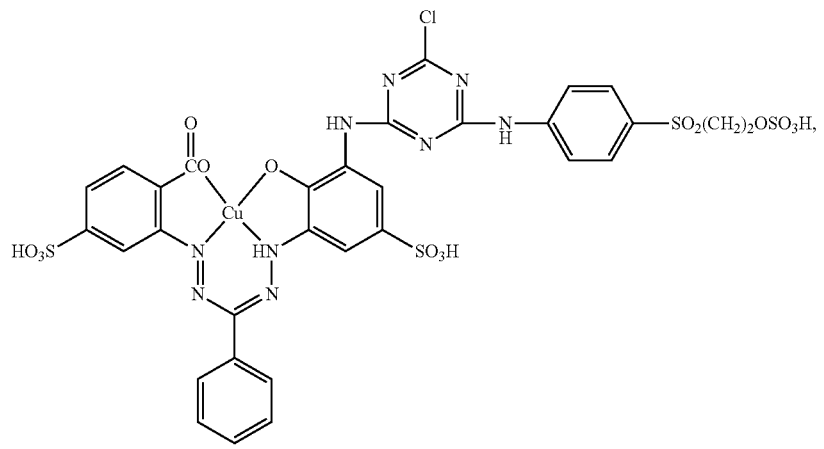
(103)
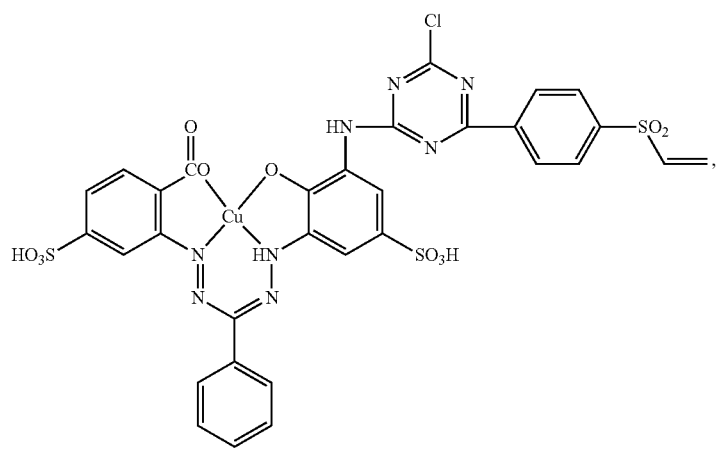
(104)
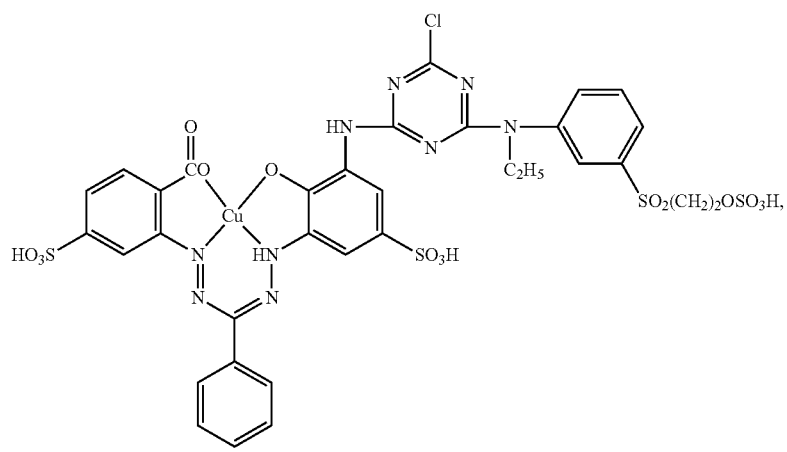

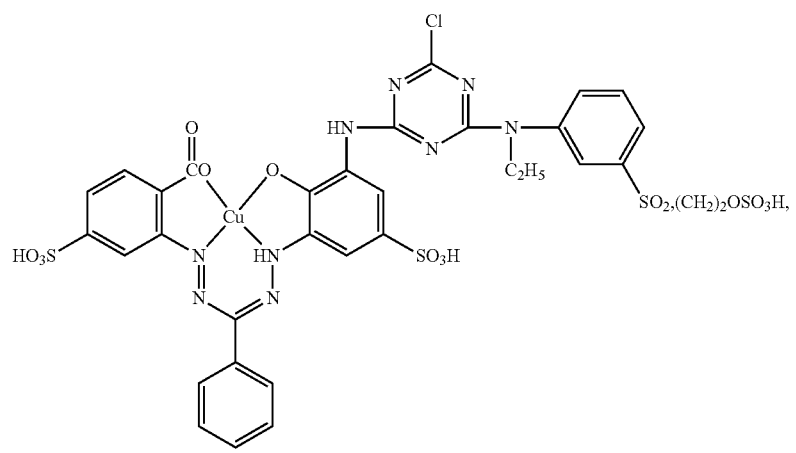
(105)
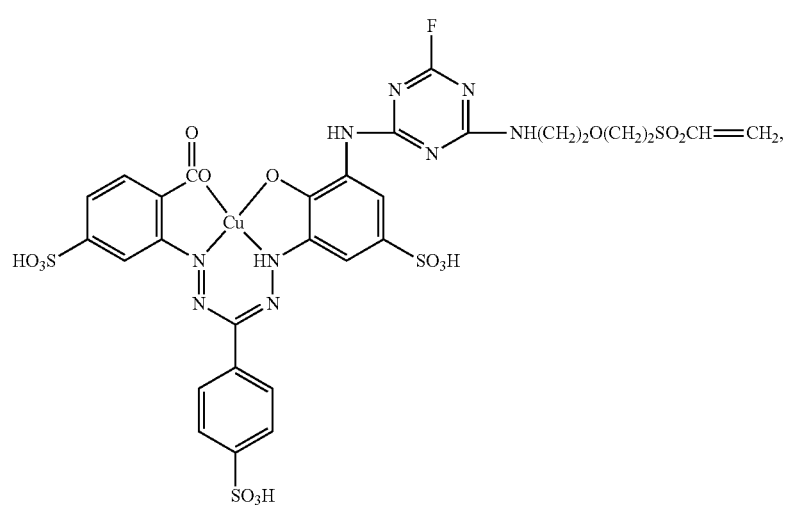
(106)
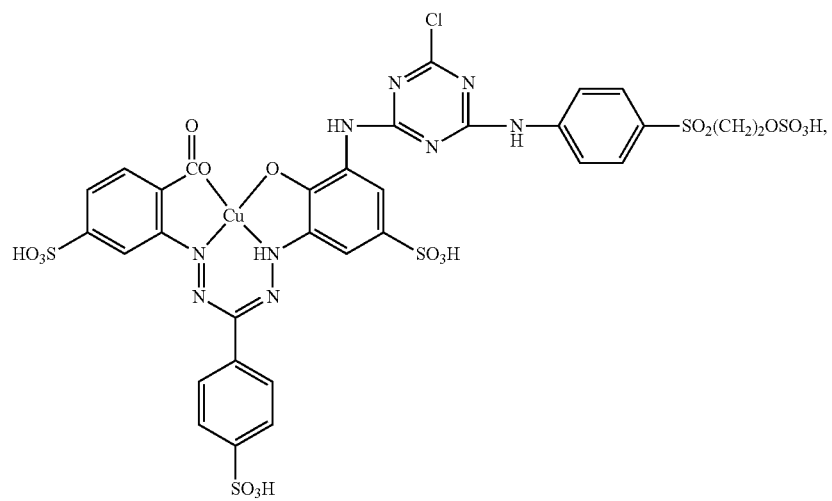
(107)

(108)
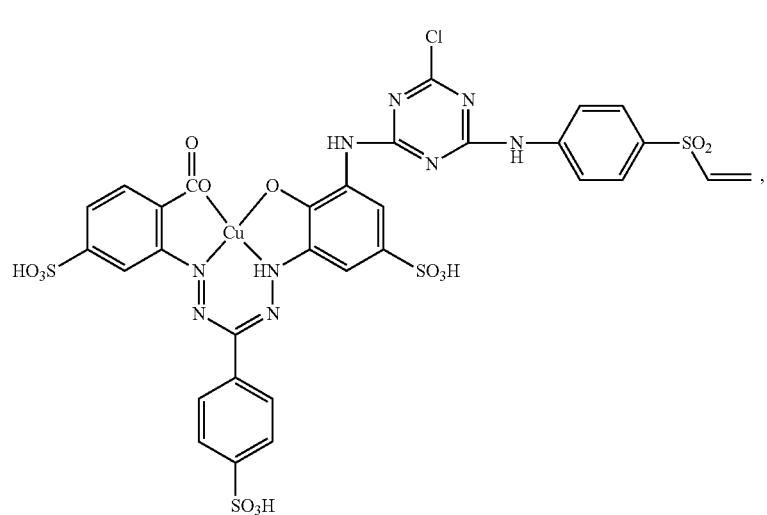
(109)
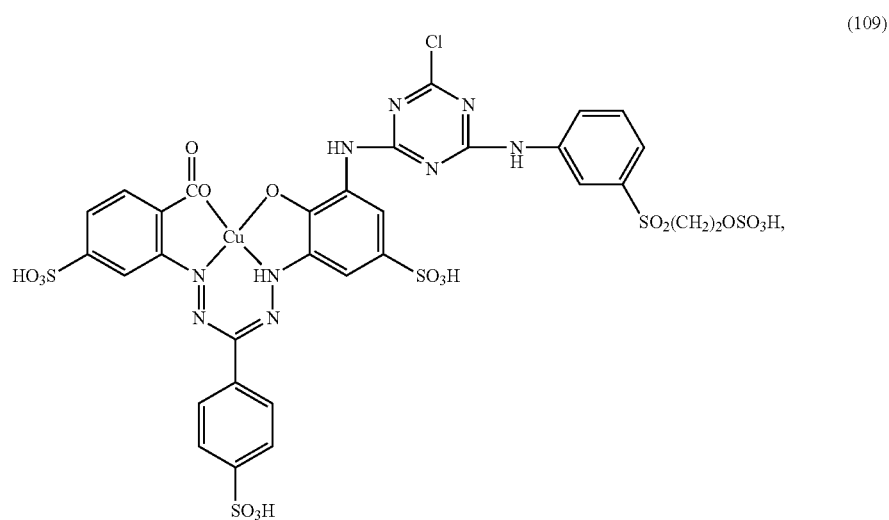
(110)
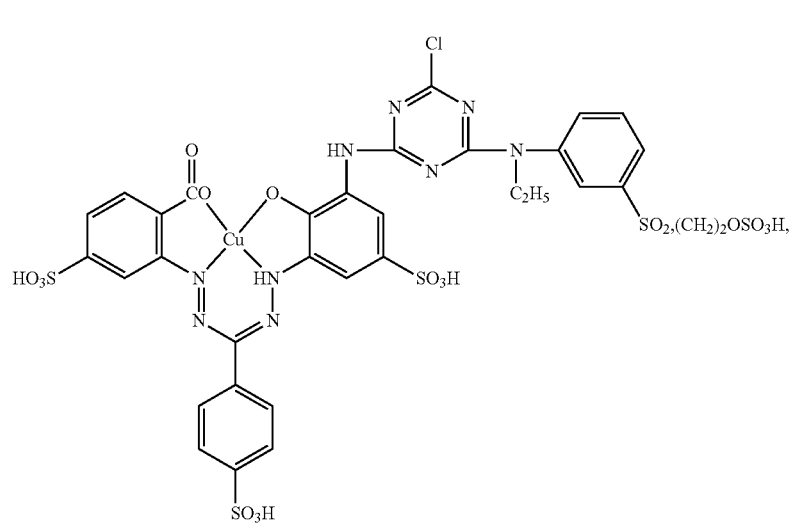

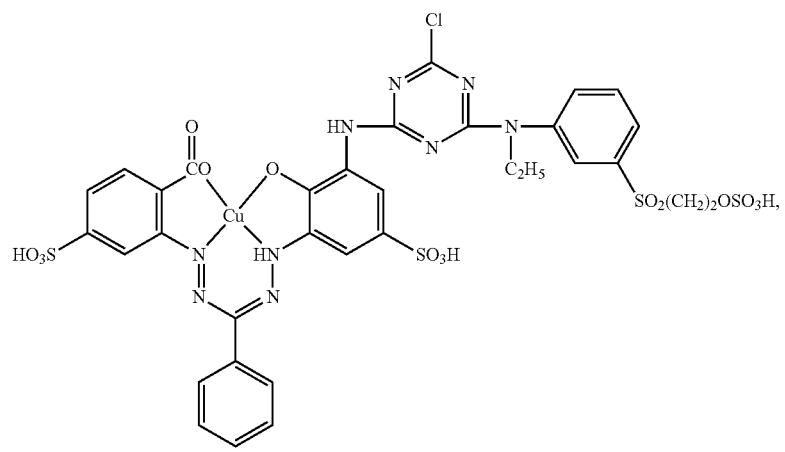
(111)
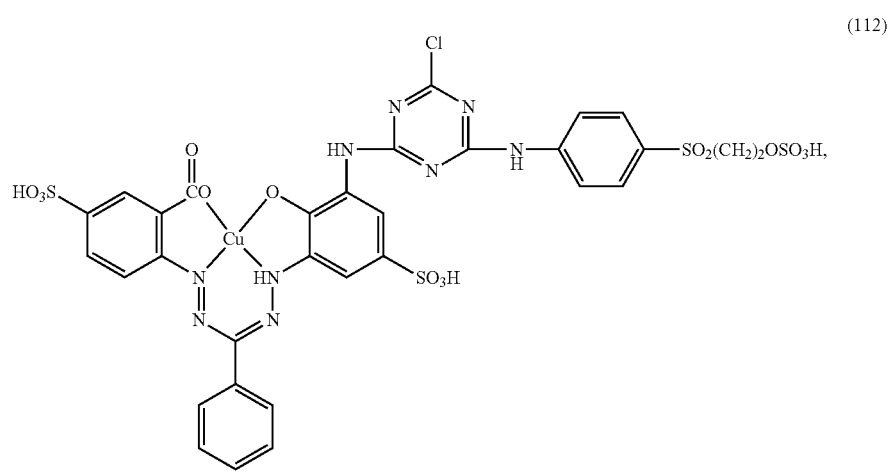
(112)
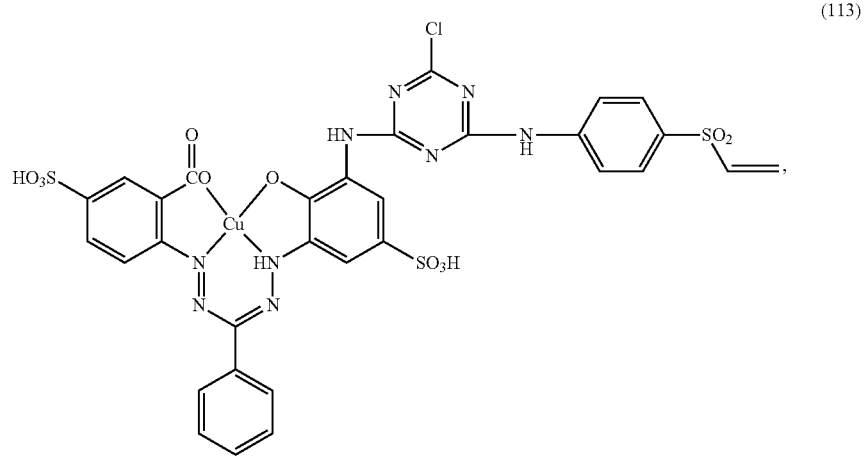
(113)

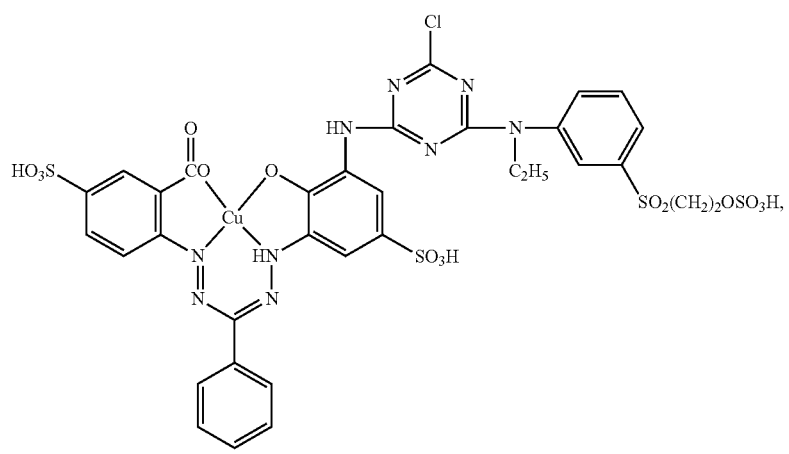
(114)
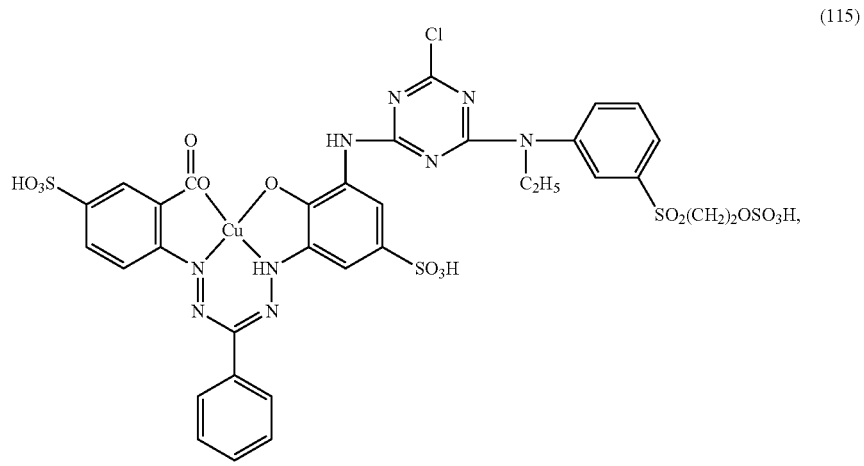
(115)
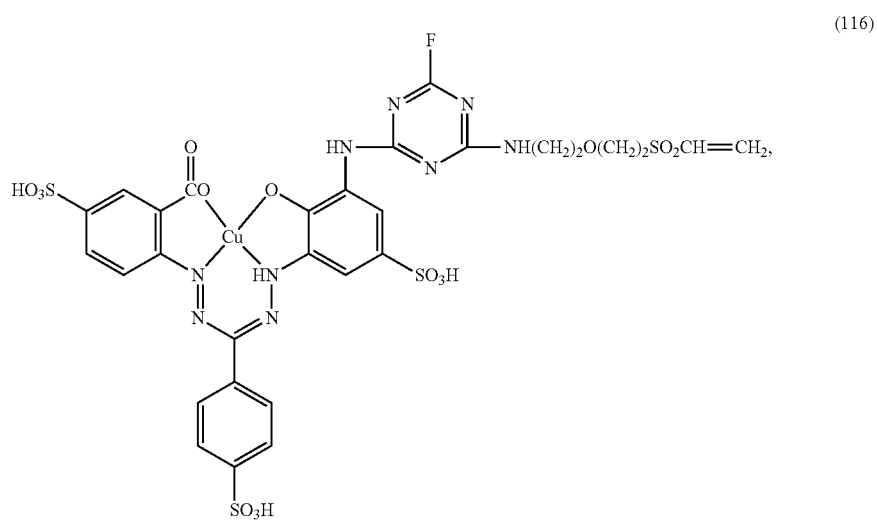
(116)

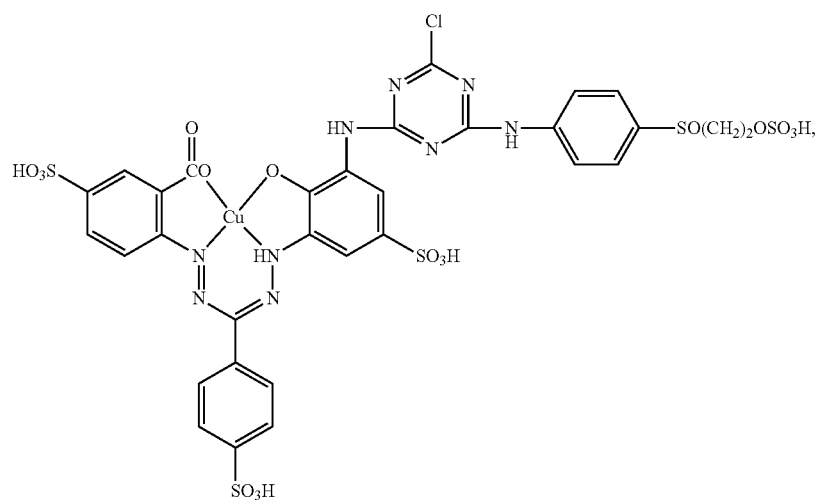
(117)
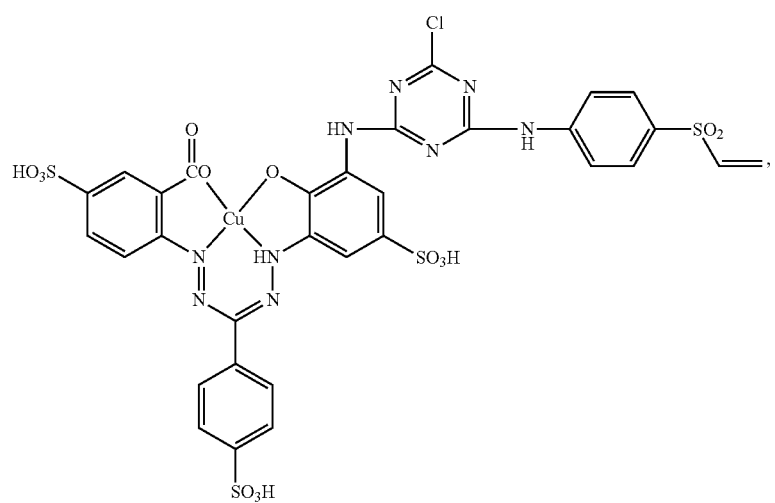
(118)
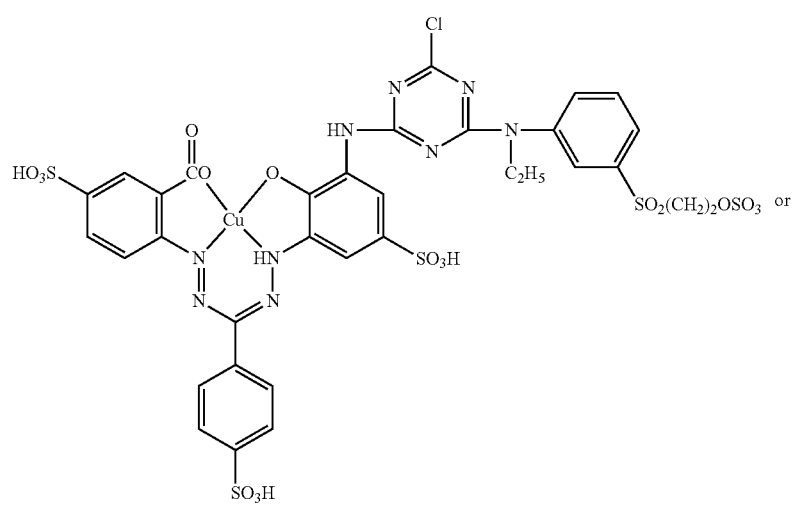
(119)

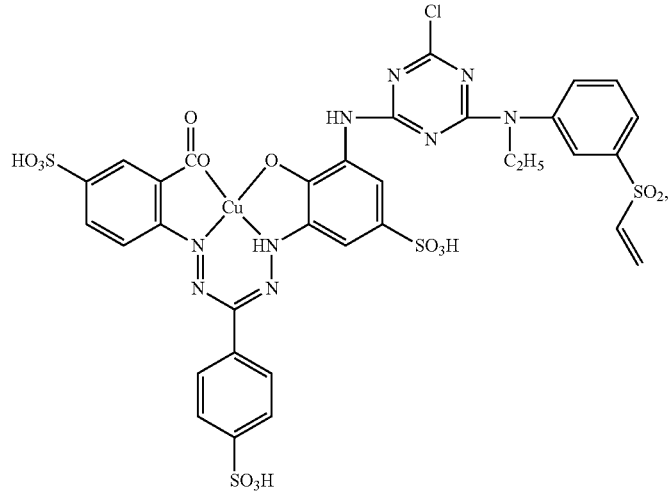
(120)
preferably of formula (102) or (103), especially of formula (102).
Preferably, the mixtures according to the invention contain at least one dye of the formula
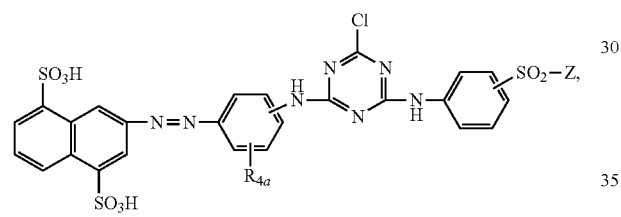
(2a)
in which $R_{4a}$ is hydrogen, $C_1$-$C_8$alkyl, $C_1$-$C_4$alkoxy, $C_2$-$C_4$alkanoylamino, ureido or halogen, and X and Z are as defined above.
The dye of formula (2) is, for example, a dye of the formula
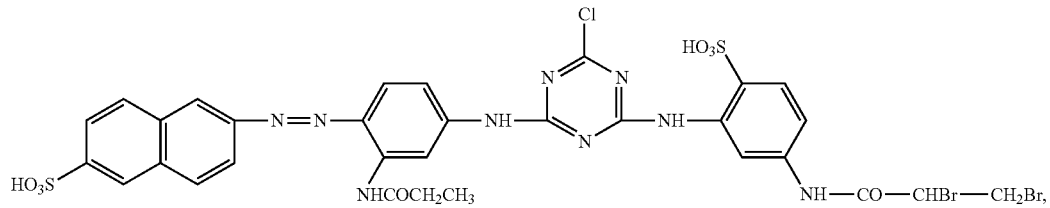
(201)
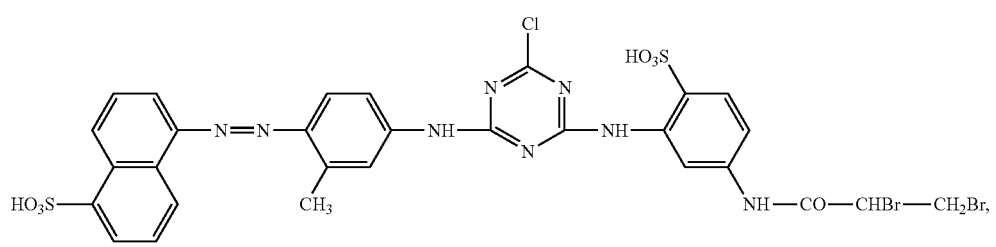
(202)
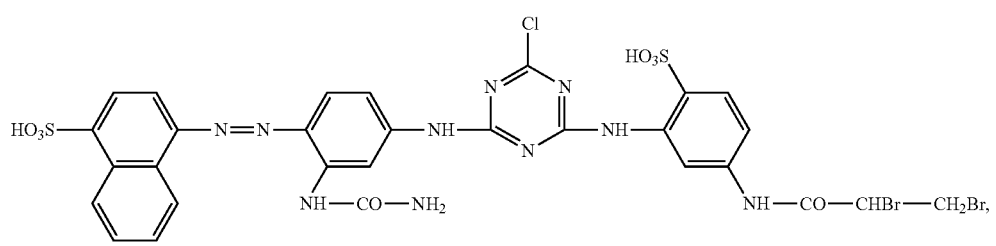
(203)

-continued
(204)
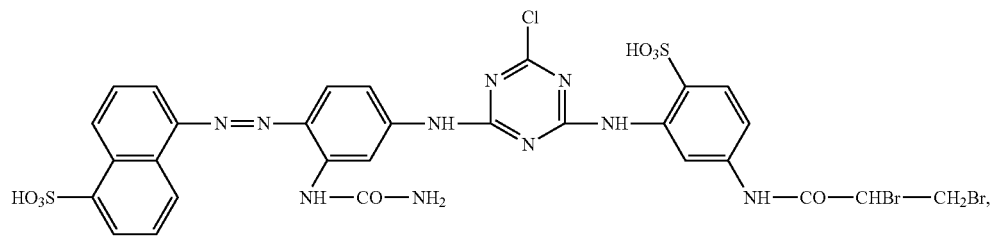
(205)
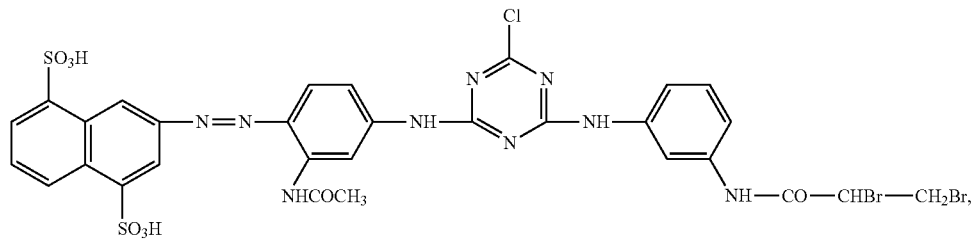
(206)
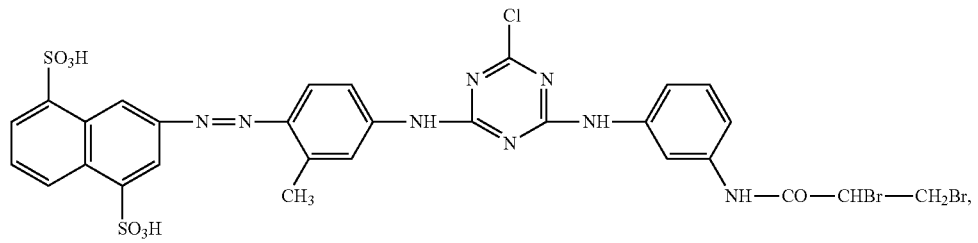
(207)
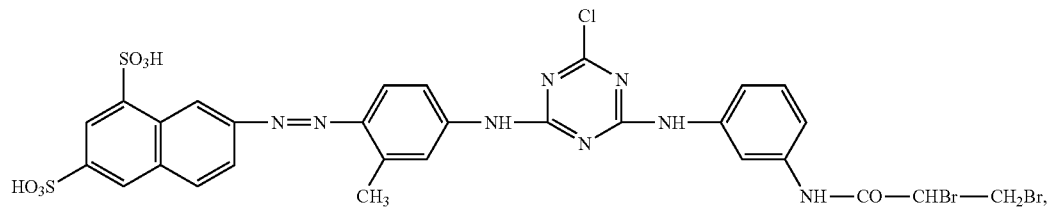
(208)
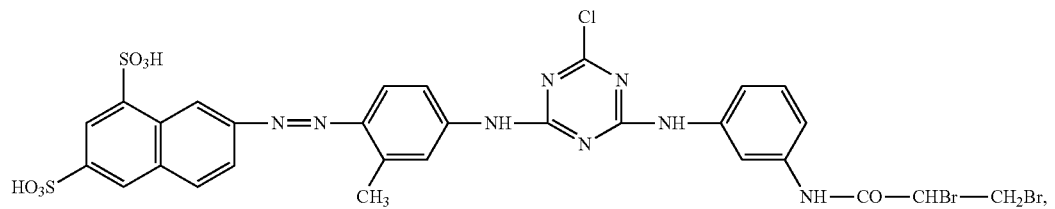
(209)
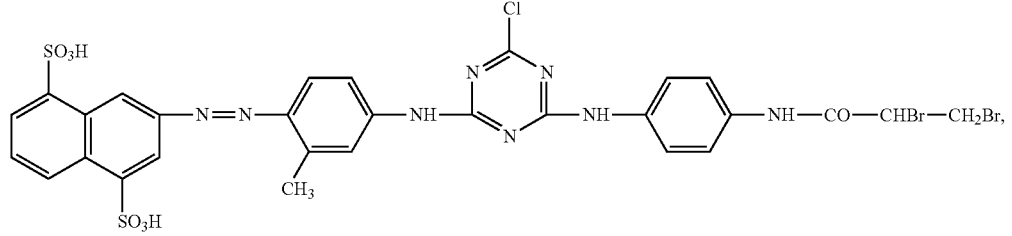
(210)
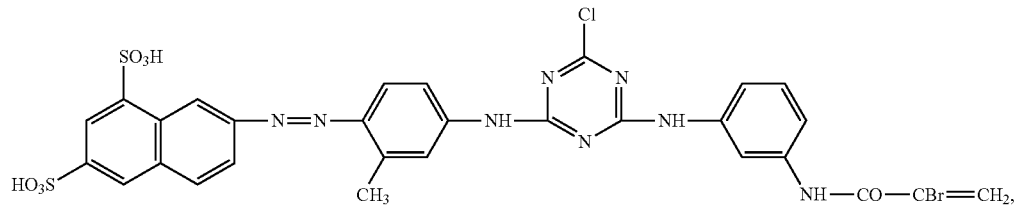

-continued
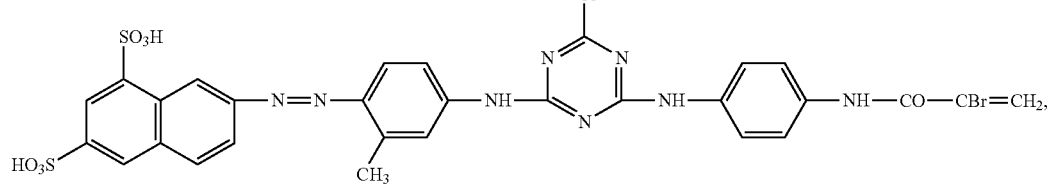
(211)
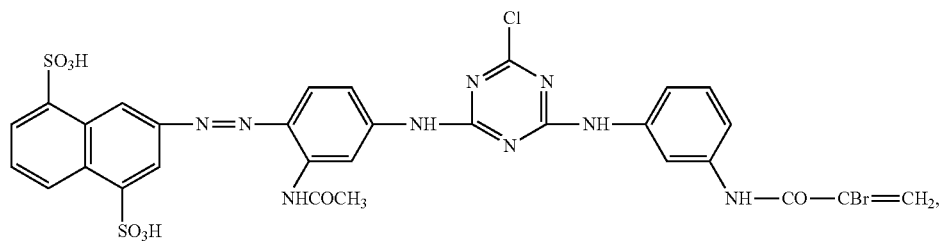
(212)
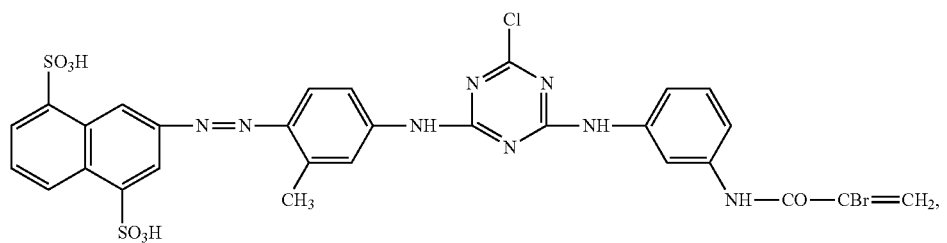
(213)
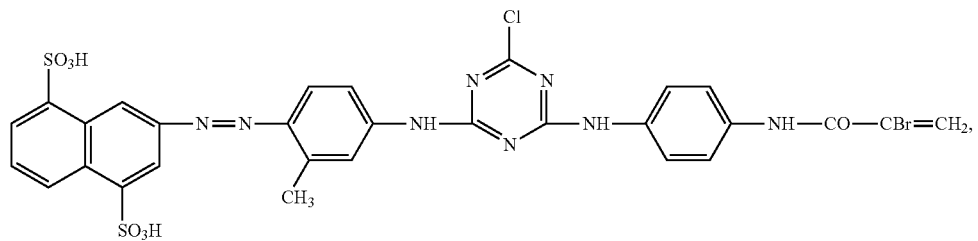
(214)
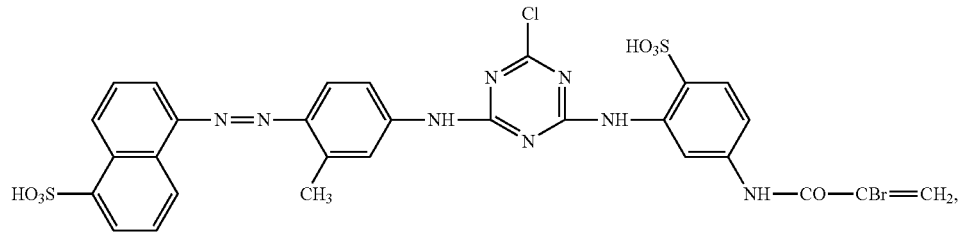
(215)
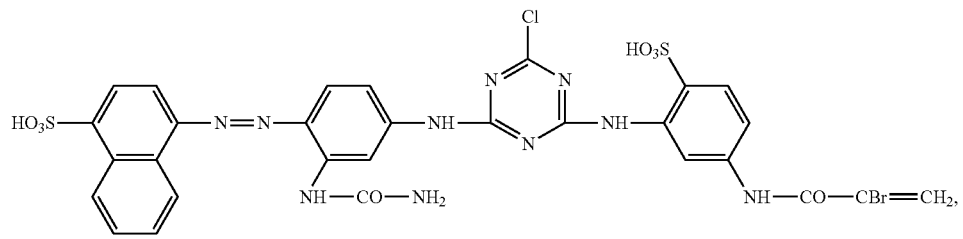
(216)

(217)
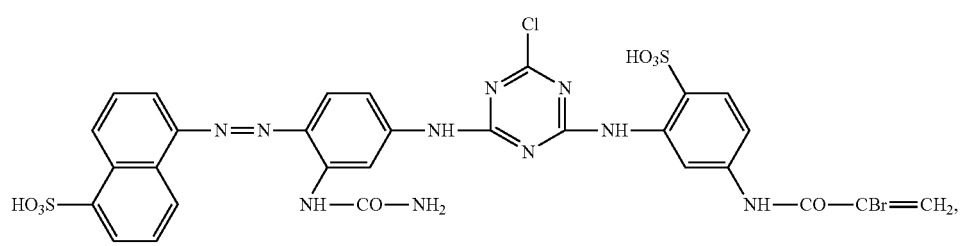
(218)
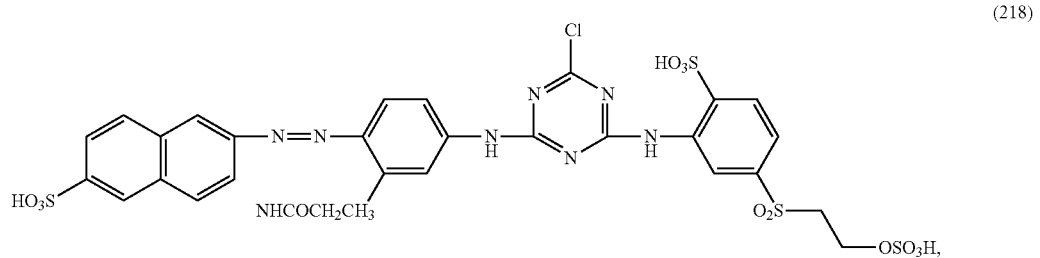
(219)
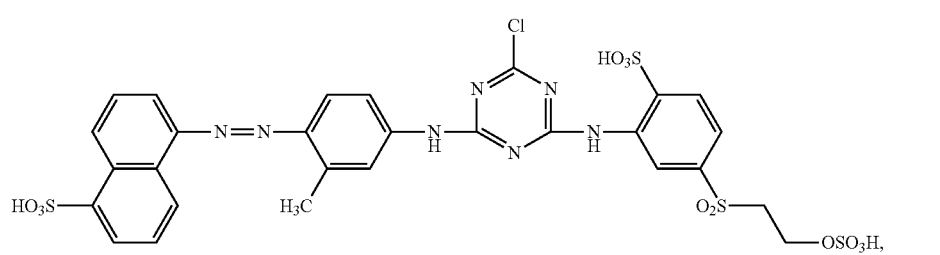
(220)
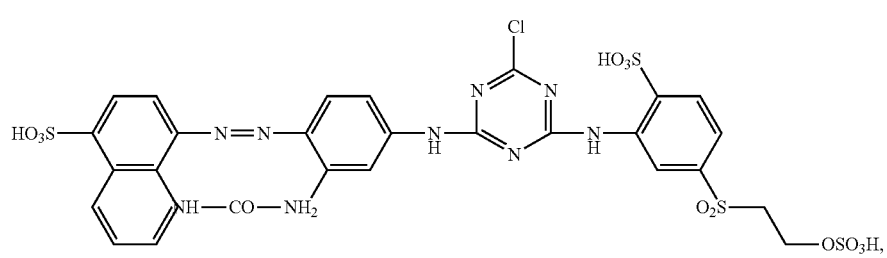
(221)
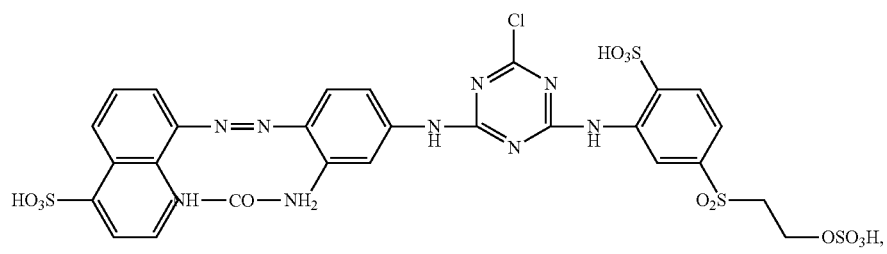
(222)
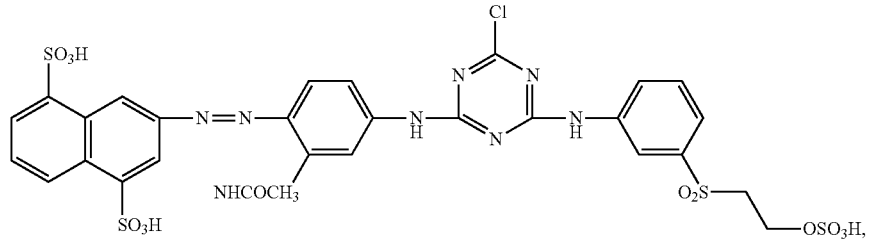

(223)
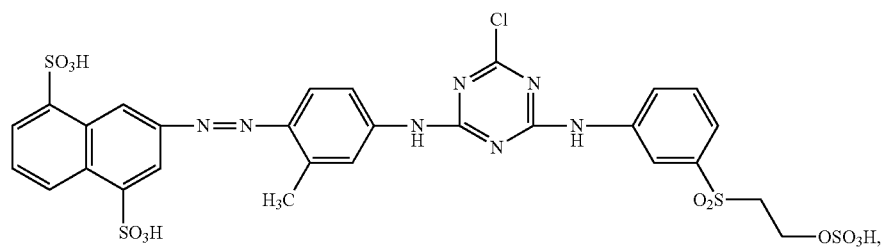
(224)
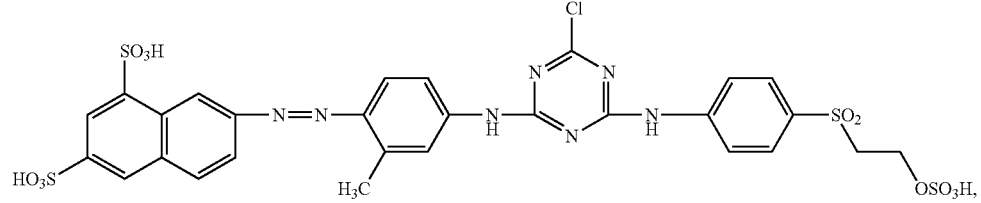
(225)
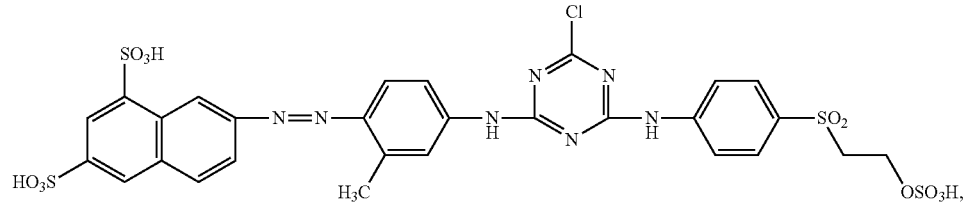
(226)
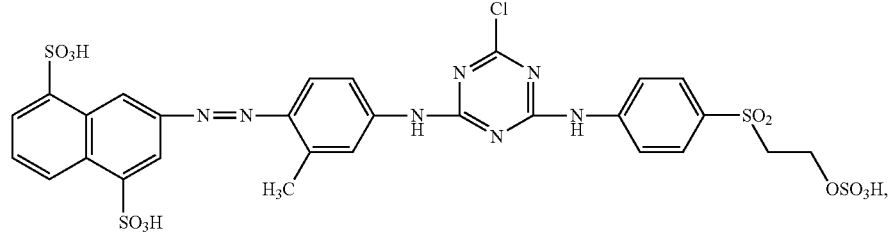
(227)
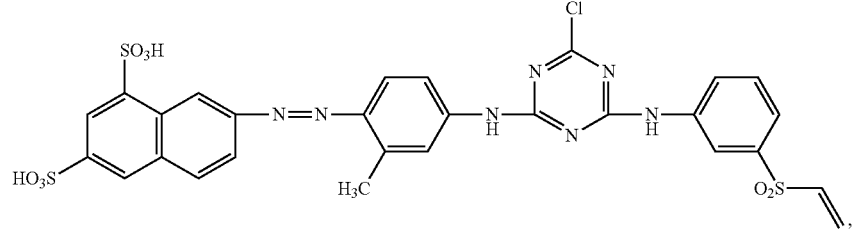
(228)
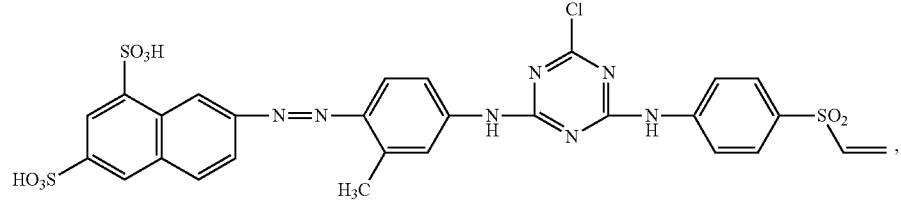

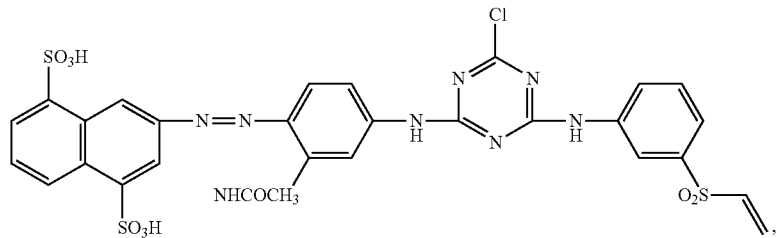
(229)
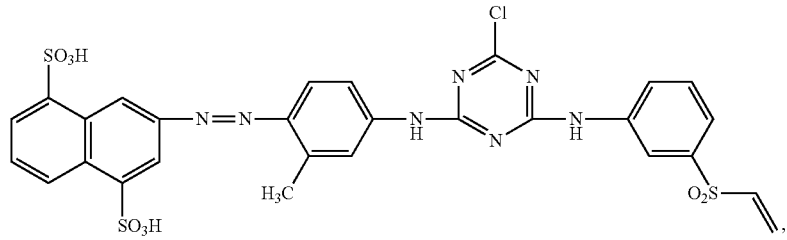
(230)
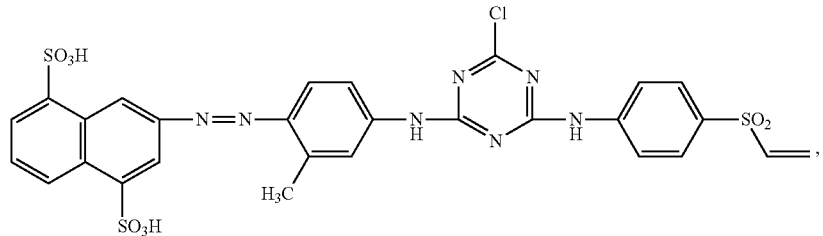
(231)
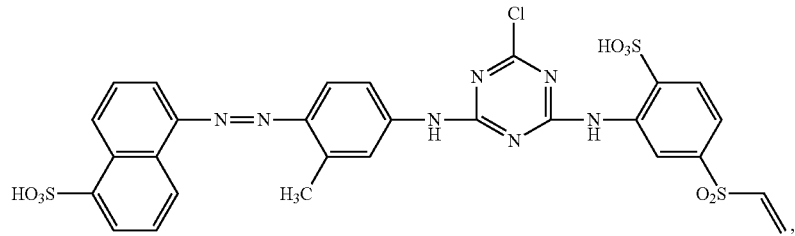
(232)
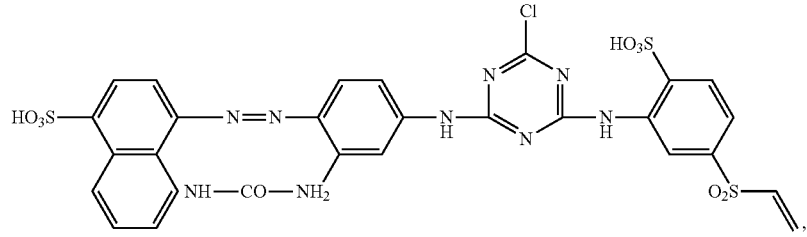
233)
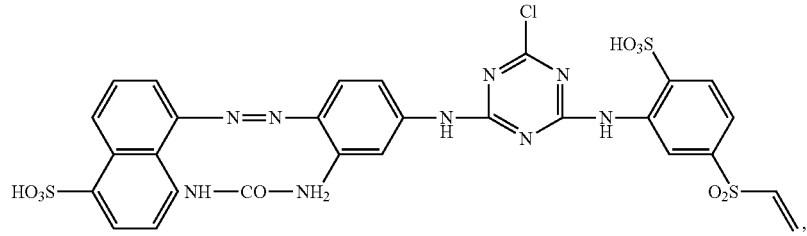
(234)

(235)

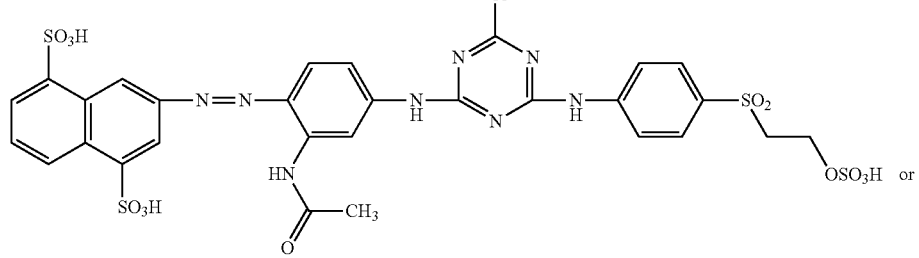

(236)

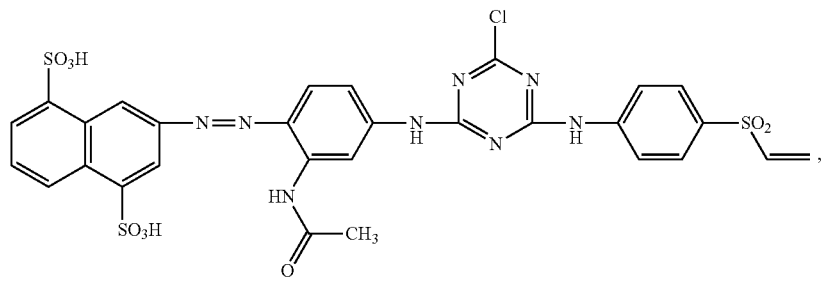

preferably a dye of formula (235) or (236), in particular a dye of formula (235).

Preferably, $D_2$ and $D_3$ are each independently of the other a radical of formula

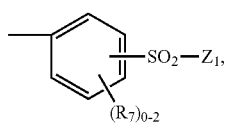 (6a)

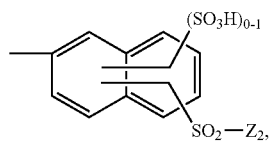 (6b)

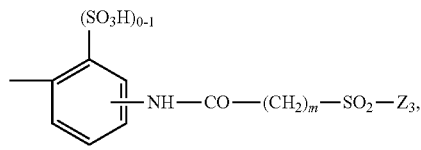 (6c)

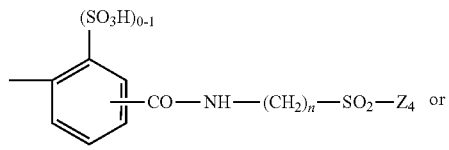 (6d)

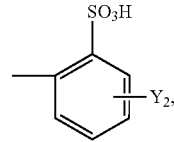 (6e)

wherein $(R_7)_{0-2}$ denotes from 0 to 2 identical or differing substituents from the group halogen, $C_1$-$C_8$alkyl, $C_1$-$C_4$alkoxy and sulfo, $Y_2$ is α,β-dibromopropionylamino or α-bromoacryloylamino, m is the number 2 or 3, n is the number 2 or 3, and $Z_1$, $Z_2$, $Z_3$ and $Z_4$ are each independently of the others vinyl, β-chloroethyl or β-sulfatoethyl.

Particularly preferred dyes of formula (3a) are those, wherein $R_5$ and $R_6$ are hydrogen, $D_3$ is a radical of formula

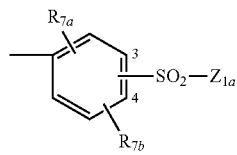 (6aa)

and $D_2$ is a radical of formula

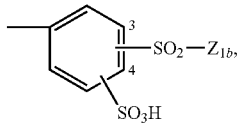 (6ab)

wherein $R_{7a}$ and $R_{7b}$ are each independently of the other methyl or methoxy, and $Z_{1a}$ and $Z_{1b}$ are each independently of the other vinyl, β-chloroethyl or β-sulfatoethyl.

Suitable dyes of formula (3a) are, for example, the compounds of formula (301)-(303)

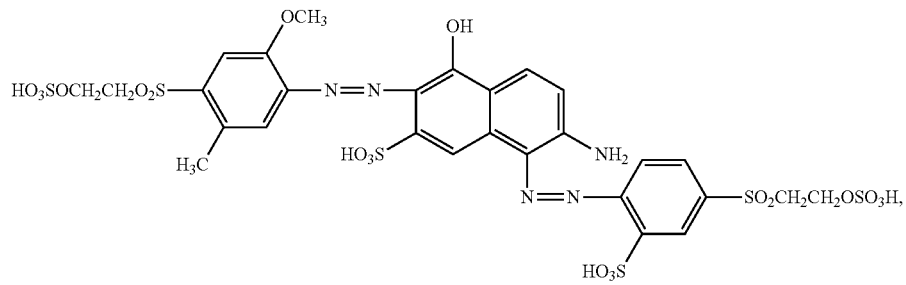
(301)

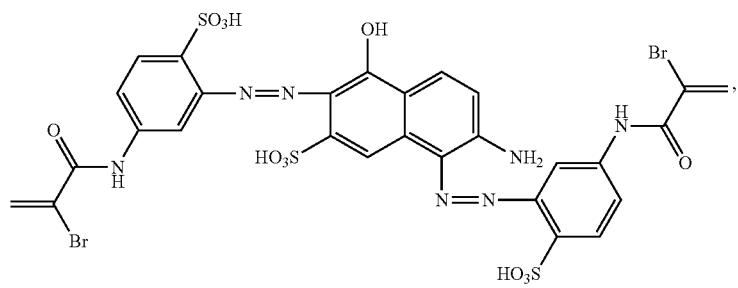
(302)

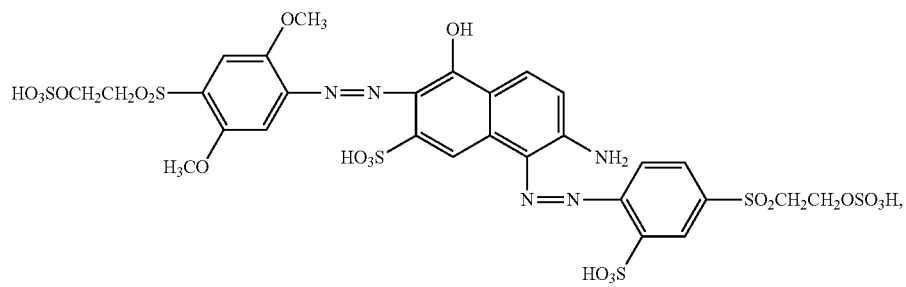
(303)

as well as the dyes of formula (304)-(362) represented by the general formula

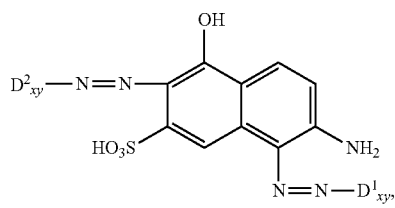

wherein $D^1_{xy}$ and $D^2_{xy}$ each correspond to the radical given in Table 1 and those radicals are as defined in Table 2.

TABLE 1

| Formula | $D^1_{xy}$ | $D^2_{xy}$ | colour shade |
|---|---|---|---|
| (304) | $D_{11}$ | $D_{11}$ | deep-red |
| (305) | $D_{12}$ | $D_{12}$ | deep-red |
| (306) | $D_{13}$ | $D_{13}$ | deep-red |
| (307) | $D_{14}$ | $D_{14}$ | deep-red |
| (308) | $D_{15}$ | $D_{15}$ | deep-red |
| (309) | $D_{16}$ | $D_{16}$ | deep-red |
| (310) | $D_{17}$ | $D_{17}$ | deep-red |
| (311) | $D_{18}$ | $D_{18}$ | deep-red |
| (312) | $D_{19}$ | $D_{19}$ | deep-red |
| (313) | $D_{20}$ | $D_{20}$ | deep-red |
| (314) | $D_{21}$ | $D_{21}$ | deep-red |

TABLE 1-continued

| Formula | $D^1_{xy}$ | $D^2_{xy}$ | colour shade |
|---|---|---|---|
| (315) | $D_{22}$ | $D_{22}$ | deep-red |
| (316) | $D_{23}$ | $D_{23}$ | deep-red |
| (317) | $D_{24}$ | $D_{24}$ | deep-red |
| (318) | $D_{25}$ | $D_{25}$ | deep-red |
| (319) | $D_{26}$ | $D_{26}$ | deep-red |
| (320) | $D_{10}$ | $D_{12}$ | deep-red |
| (321) | $D_{12}$ | $D_{10}$ | deep-red |
| (322) | $D_{10}$ | $D_{13}$ | deep-red |
| (323) | $D_{13}$ | $D_{10}$ | deep-red |
| (324) | $D_{10}$ | $D_{20}$ | deep-red |
| (325) | $D_{21}$ | $D_{13}$ | deep-red |
| (326) | $D_{10}$ | $D_{14}$ | deep-red |
| (327) | $D_{10}$ | $D_{15}$ | deep-red |
| (328) | $D_{10}$ | $D_{16}$ | deep-red |
| (329) | $D_{10}$ | $D_{17}$ | deep-red |
| (330) | $D_{10}$ | $D_{18}$ | deep-red |
| (331) | $D_{10}$ | $D_{19}$ | deep-red |
| (332) | $D_{10}$ | $D_{21}$ | deep-red |
| (333) | $D_{10}$ | $D_{22}$ | deep-red |
| (334) | $D_{10}$ | $D_{23}$ | deep-red |
| (335) | $D_{10}$ | $D_{24}$ | deep-red |
| (336) | $D_{10}$ | $D_{25}$ | deep-red |
| (337) | $D_{10}$ | $D_{26}$ | deep-red |
| (338) | $D_{13}$ | $D_{20}$ | deep-red |
| (339) | $D_{14}$ | $D_{11}$ | deep-red |
| (340) | $D_{29}$ | $D_{32}$ | deep-red |
| (341) | $D_{29}$ | $D_{30}$ | deep-red |
| (342) | $D_{29}$ | $D_{10}$ | deep-red |
| (343) | $D_{29}$ | $D_{31}$ | deep-red |
| (344) | $D_{33}$ | $D_{33}$ | deep-red |
| (345) | $D_{28}$ | $D_{28}$ | deep-red |

TABLE 1-continued

| Formula | $D^1_{xy}$ | $D^2_{xy}$ | colour shade |
|---------|-----------|-----------|--------------|
| (346) | $D_{28}$ | $D_{27}$ | deep-red |
| (347) | $D_{10}$ | $D_{29}$ | deep-red |
| (348) | $D_{10}$ | $D_{31}$ | deep-red |
| (349) | $D_{11}$ | $D_{31}$ | deep-red |
| (350) | $D_{31}$ | $D_{11}$ | deep-red |
| (351) | $D_{33}$ | $D_{11}$ | deep-red |
| (352) | $D_{34}$ | $D_{34}$ | deep-red |
| (353) | $D_{21}$ | $D_{34}$ | deep-red |
| (354) | $D_{34}$ | $D_{21}$ | deep-red |
| (355) | $D_{34}$ | $D_{10}$ | deep-red |
| (356) | $D_{10}$ | $D_{34}$ | deep-red |
| (357) | $D_{31}$ | $D_{31}$ | deep-red |
| (358) | $D_{10}$ | $D_{33}$ | deep-red |
| (359) | $D_{13}$ | $D_{32}$ | deep-red |
| (360) | $D_{19}$ | $D_{21}$ | deep-red |
| (361) | $D_{35}$ | $D_{35}$ | deep-red |
| (362) | $D_{10}$ | $D_{35}$ | deep-red |

TABLE 2

$D_{xy}$ $D_{10}$ = —C$_6$H$_4$—SO$_2$—CH$_2$—CH$_2$—OSO$_3$H $D_{11}$ = 4-methyl-3-sulfo-phenyl with NH—CO—CHBr—CH$_2$Br substituent $D_{12}$ = 3-methylphenyl-SO$_2$—CH$_2$—CH$_2$—OSO$_3$H $D_{13}$ = 4-methyl-3-sulfo-phenyl-SO$_2$—CH$_2$—CH$_2$—OSO$_3$H $D_{14}$ = 4-methyl-3-sulfo-phenyl with NH—CO—CHBr—CH$_2$Br substituent $D_{15}$ = 4-methylphenyl—CONH—(CH$_2$)$_2$—SO$_2$—(CH$_2$)$_2$—Cl $D_{16}$ = 4-methyl-3-sulfo-phenyl—CONH—(CH$_2$)$_2$—SO$_2$—(CH$_2$)$_2$—Cl $D_{17}$ = 4-methylphenyl—CONH—(CH$_2$)$_2$—SO$_2$—(CH$_2$)$_2$—OSO$_3$H $D_{18}$ = 4-methyl-3-sulfo-phenyl—CONH—(CH$_2$)$_2$—SO$_2$—(CH$_2$)$_2$—OSO$_3$H $D_{19}$ = 3-methylphenyl—CONH—(CH$_2$)$_2$—SO$_2$—(CH$_2$)$_2$—OSO$_3$H $D_{20}$ = 4-methoxy-3-methyl-phenyl-SO$_2$—CH$_2$—CH$_2$—OSO$_3$H $D_{21}$ = 2-methoxy-5-methyl-phenyl-SO$_2$—CH$_2$—CH$_2$—OSO$_3$H (with additional methyl)

$D_{22}$ = 2,5-dimethoxy-4-methyl-phenyl-SO$_2$—CH$_2$—CH$_2$—OSO$_3$H $D_{23}$ = 2-methyl-7-sulfo-naphthyl-SO$_2$—CH$_2$—CH$_2$—OSO$_3$H $D_{24}$ = 2-methyl-8-sulfo-naphthyl-SO$_2$—CH$_2$—CH$_2$—OSO$_3$H $D_{25}$ = 7-methyl-naphthyl-SO$_2$—CH$_2$—CH$_2$—OSO$_3$H $D_{26}$ = 7-methyl-3-sulfo-naphthyl-SO$_2$—CH$_2$—CH$_2$—OSO$_3$H

TABLE 2-continued

| $D_{xy}$ |
|---|
| $D_{27}$ = 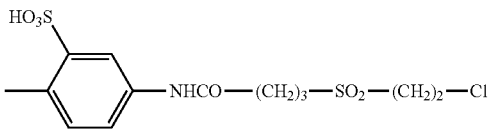 |
| $D_{28}$ = 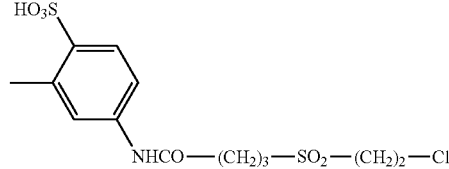 |
| $D_{29}$ = 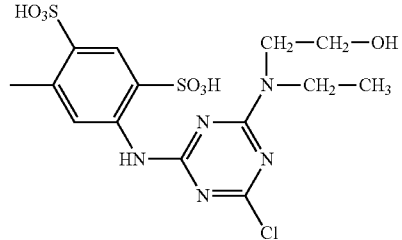 |
| $D_{30}$ = 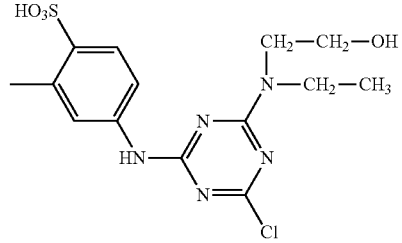 |
| $D_{31}$ = 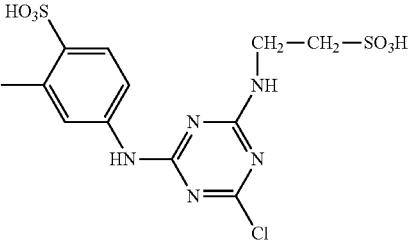 |
| $D_{32}$ = 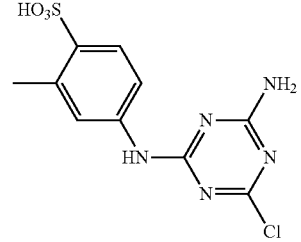 |
| $D_{33}$ = 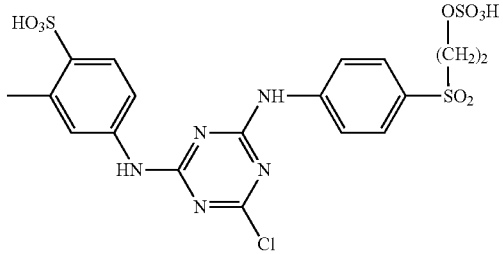 |

TABLE 2-continued

| $D_{xy}$ |
|---|
| $D_{34}$ = 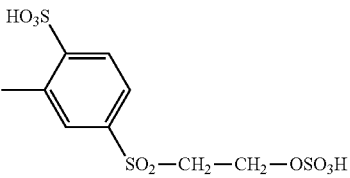 |
| $D_{35}$ = 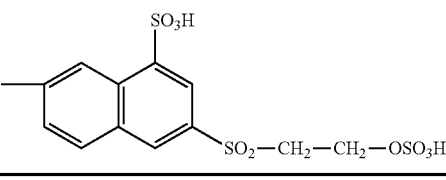 |

Preferred dyes of formula (3a) are the dyes of formula (301), (302), (303) and (304), in particular the dyes of formula (302) and (304).

A suitable dye of formula (3b) is, for example, the compound of formula

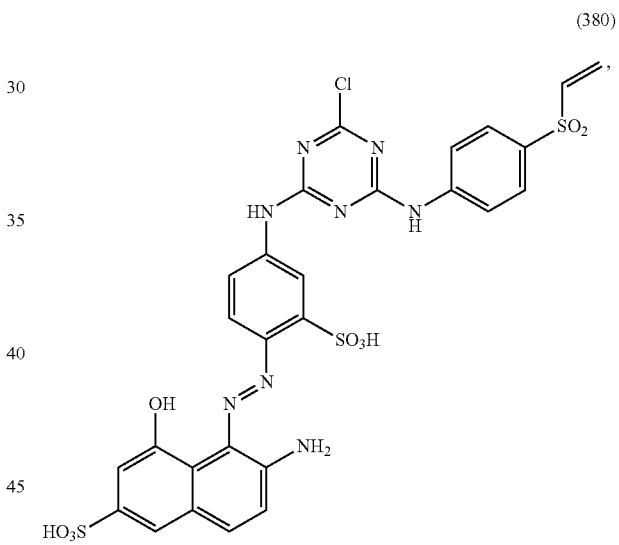

(380)

The dyes of formulae (1), (2), (3a) and (3b) are known in some cases or they can be prepared in accordance with processes known per se. Dyes of the formula (1) are disclosed, for example, in WO 2005/090485 and WO 2007/003541. Dyes of the formula (2) are disclosed, for example, in EP 775 731. Dyes of the formula (3a) are disclosed, for example, in WO 2005/040285.

The dye mixtures according to the invention can be prepared, for example, by mixing the individual dyes together. The mixing procedure is effected, for example, in suitable mills, e.g. ball mills or pin mills, as well as in kneaders or mixers. The dye mixtures according to the invention can also be prepared, for example, by dissolving the reactive dyes directly in the dyebath or the printing medium. The amount of the individual reactive dyes is governed by the shade to be obtained. The dye of formula (1) and the total amount of the dyes of formulae (2), (3a) and (3b) are present in the dye mixtures according to the invention in a ratio by weight of, for example, from 1:99 to 99:1, preferably from 5:95 to 95:5 and especially from 10:90 to 90:10.

The reactive dyes of formulae (1), (2), (3a) and (3b) and accordingly also the dye mixtures according to the invention may comprise further additives, for example, sodium chloride or dextrin.

If desired, the reactive dyes of formulae (1), (2), (3a) and (3b) and accordingly also the dye mixtures according to the invention may comprise further auxiliaries which, for example, improve handling or increase storage stability, such as buffers, dispersants or anti-dusts. Such auxiliaries are known to the person skilled in the art.

The dye mixtures according to the invention are suitable for the dyeing and printing of an extremely wide variety of materials, especially nitrogen-containing fibre materials. Examples thereof are silk, leather and in particular wool. The dye mixtures according to the invention and the reactive dyes according to the invention are also suitable for the dyeing or printing of nitrogen-group-containing fibres that are contained in blend fabrics, for example mixtures of wool with polyester fibres or polyamide fibres.

The said textile fibre material may be in an extremely wide variety of processing forms, such as, for example, in the form of loose stock, fibres, yarn, woven fabric or knitted fabric. Wool can advantageously be dyed in various forms, for example as tippy wool, as fabric or as fur.

The present invention relates also to a method for the dichromatic or trichromatic dyeing or printing of nitrogen-containing fibre materials, especially wool fibre materials, which method comprises using at least one red dyeing dye, for example one, two or three dyes, preferably one dye, of the above-mentioned formula (1), together with at least one yellow or blue dyeing dye, for example one, two or three dyes, from the group of the above-mentioned formulae (2), (3a) and (3b), wherein $R_1$-$R_{13}$, U, $D_1$, $D_2$, $D_3$, $V_1$, $V_2$, X, $X_1$, $X_2$, Y, $Y_1$, $Y_2$, Z, $Z_1$, $Z_2$, $Z_3$, r, s and t each have the meanings and preferred meanings defined above.

Preference is given to corresponding methods for the trichromatic dyeing or printing of hydroxy-group-containing or nitrogen-containing fibre materials, wherein at least one dye of the above-mentioned formula (1) is used together with at least one dye from the group of the formulae (2) and (3), wherein $R_1$-$R_{13}$, U, $D_1$, $D_2$, $D_3$, $V_1$, $V_2$, X, $X_1$, $X_2$, Y, $Y_1$, $Y_2$, Z, $Z_1$, $Z_2$, $Z_3$, r, s and t each have the meanings and preferred meanings defined above.

The method according to the invention for dichromatic or trichromatic dyeing and printing can be carried out in accordance with customary dyeing and printing methods, for example, according to the so-called cold pad-batch process, in which the dye is applied, together with the alkali, on the padder and is then fixed by storage for several hours at about room temperature, for example, from 25 to 35° C. Preferably, the method according to the invention for dichromatic or trichromatic dyeing and printing is carried out according to the exhaust-dyeing method, in which the goods are impregnated with aqueous, optionally salt-containing dye solutions, and the dyes are fixed without an alkali treatment, optionally under the action of heat.

The dye liquors or print pastes, in addition to containing water and the dyes, may also comprise further additives, for example shading dyes known per se, salts, buffer substances, wetting agents, anti-foams, levelling agents or agents that influence the properties of the textile material, for example, softeners, additives for flame-resistant finishes or dirt-, water- or oil-repellants, as well as water-softeners and natural or synthetic thickeners, e.g. alginates or cellulose ethers.

The amounts in which the individual dyes are used in the dyebaths or print pastes can vary within wide limits in dependence upon the desired depth of shade; in general, amounts of from 0.01 to 15% by weight, especially from 0.1 to 10% by weight, based on the goods being dyed or on the print paste, have proved advantageous.

The dyes of formulae (1), (2), (3a) and (3b) used in the method according to the invention are distinguished in dichromatic or trichromatic dyeing or printing by uniform colour build-up, good exhaustion and fixing behaviour, good constancy of shade even in different concentrations, a low sensitivity to various dyeing parameters and, in particular, very good combinability. Dyeing times can be reduced. Furthermore, they have sufficient substantivity and at the same time have good ease of washing off of unfixed dye and can advantageously be applied at short liquor ratios, for example, at a liquor ratio of from 1:4 to 1:6, preferably, 1:6. The dyeings and prints produced in accordance with the method of the invention exhibit very good fastness properties, such as wash and water fastness and perspiration fastness, and good reproducibility.

Preferred are dichromatic or trichromatic dyeing methods.

Special appliances are not required. It is possible to use, for example, the customary dyeing apparatus, e.g. open baths, winch becks, jiggers, or paddle jet or circulation apparatus.

Processing is conveniently carried out in the temperature range from e.g. 70 to 110° C. and, preferably, from 80 to 105° C., for example, at 100° C. The treatment time may typically be from 20 to 100 minutes and, preferably, from 30 to 60 minutes. The pH of the liquor is usually in the range from 3 to 7 and, preferably, from 4 to 6.

The dichromatic or trichromatic dyeing or printing method according to the invention allow for considerable savings of resources, such as water and energy. The time required for dyeing or printing is considerably reduced.

The gentle dyeing or printing method using the dichromatic or trichromatic dye mixtures according to the invention ensures a high quality of the dyed wool and reduces the wastage of material.

The dye mixtures according to the invention are also suitable as colorants for use in recording systems. Such recording systems are, for example, commercially available ink-jet printers for paper or textile printing, or writing implements, such as fountain pens or ballpoint pens, and especially ink-jet printers. For that purpose, the dye mixture according to the invention or the dyes according to the invention are first converted into a form suitable for use in recording systems. A suitable form is, for example, an aqueous ink comprising at least one dye of the mixture according to the invention or the dyes according to the invention as colorant. The inks can be prepared in customary manner by mixing together the individual constituents customary in ink-jet printing in the desired amount of water. Conveniently, individual inks, comprising at least one dye of formulae (1), (2), (3a), (3b), (4), (5) and (6), are used in a multi color ink-jet printer and mixing is effected on the substrate by digital printing. For example, one ink comprises a dye of formula (1). Another ink comprises a dye of formula (2) and still another ink comprises a dye of formula (3a).

Examples of substrates that come into consideration for ink-jet printing, in addition to paper or plastics films, include the above-mentioned hydroxy-group-containing or nitrogen-containing fibre materials, especially cellulosic fibre materials. The substrates are preferably textile fibre materials.

The following Examples serve to illustrate the invention. Unless otherwise indicated, temperatures are given in degrees Celsius, parts are parts by weight and percentages relate to percent by weight. Parts by weight relate to parts by volume in a ratio of kilograms to liters.

EXAMPLE 1

0.66 part of the blue-dyeing dye of formula (102), 0.66 part of the yellow-dyeing dye of formula (235) and 0.66 part of the red-dyeing dye of formula (304) are dissolved in 200 parts of water, and 10.0 part of sodium sulfate, 4.0 part of a levelling assistant (based on the condensation product of a higher aliphatic amine and ethylene oxide) and 0.4 part of sodium acetate are added. The pH is then brought to a value of 5.0 with 0.3 ml/l acetic acid (80%). The dyebath is heated at 40° C. for 10 minutes and 10 parts of a woollen fabric (pretreated for at least 30 min at 80° C. with 0.2 g/l Ultravon® GPN extra, a commercial wetting agent supplied by Huntsman, liquor ratio 1:40, and subsequently spun) are then added. The bath is heated to a temperature of 100° C. in the course of about 50 minutes and dyeing is carried out at this temperature for 60 minutes. Thereafter, the bath is allowed to cool to 50° C. and the dyed goods are removed. The woollen fabric is washed with hot and cold water and then centrifuged and dried. A brown dyeing is obtained which has good light and wet fastness properties and good levelness.

EXAMPLE 2

5 g of tippy wool are pretreated with 1.0 g/l Ultravon® GPN extra (commercial wetting agent supplied by Huntsman) at 70° C. for 20 min, liquor ratio 1:40. The flocks are washed with warm water, cold water, deionized water and centrifuged.

0.33 part of the blue-dyeing dye of formula (102), 0.33 part of the yellow-dyeing dye of formula (235) and 0.33 part of the blue-dyeing dye of formula (304) are dissolved in 200 parts of water, and 10.0 part of sodium sulfate, 2.0 part of a levelling assistant (based on the condensation product of a higher aliphatic amine and ethylene oxide) and 0.4 part of sodium acetate are added. The pH is then brought to a value of 5.5 with 0.1 ml/l acetic acid (80%). The dyebath is heated at 40° C. for 10 minutes and 5 parts of tippy wool are then added. The bath is heated to a temperature of 100° C. in the course of about 50 minutes and dyeing is carried out at this temperature for 60 minutes. Thereafter, the bath is allowed to cool to 50° C. and the dyed goods are removed. The wool is washed with hot and cold water and then centrifuged and dried. A brown dyeing is obtained which has good light and wet fastness properties and good levelness.

What is claimed is:

1. A dye mixture, comprising at least one blue dyeing dye of the formula:

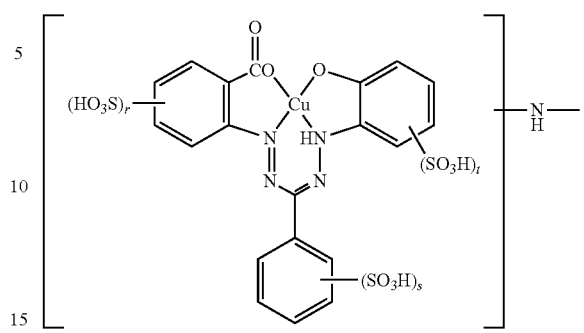

and at least one yellow or red dyeing dye selected from the group consisting of the formulae:

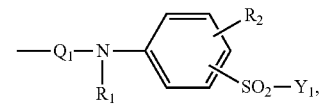

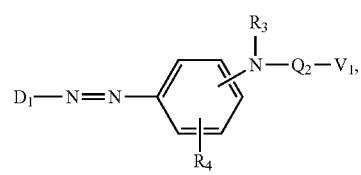

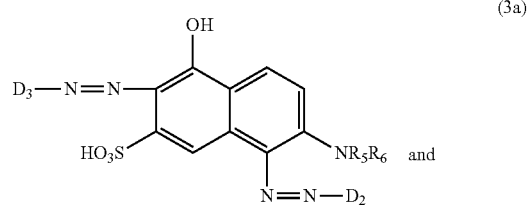

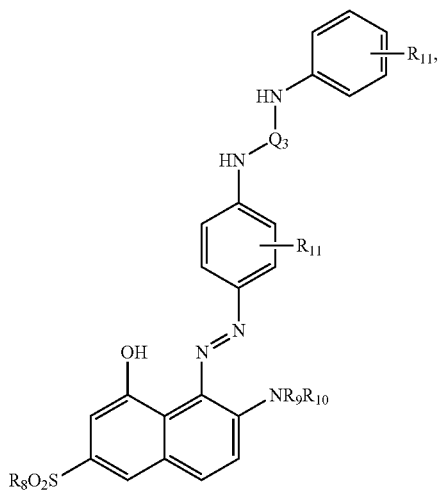

wherein $Q_1$, $Q_2$ and $Q_3$ represent each independently of the other a bivalent radical of formula

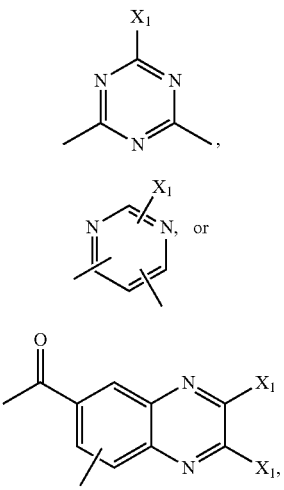

wherein X₁ denotes chlorine or fluorine, $R_1$ is hydrogen or a $C_1$-$C_8$ alkyl, $R_2$ is hydrogen, a $C_1$-$C_8$ alkyl, $C_1$-$C_4$ alkoxy or sulfo, $Y_1$ is vinyl or a radical —$CH_2$—$CH_2$—U and U is a leaving group removable under alkaline conditions, $R_3$ is hydrogen or a $C_1$-$C_8$ alkyl that is unsubstituted or substituted by hydroxy, sulfo, sulfato, cyano, carboxy, $C_1$-$C_4$ alkoxy or phenyl, $R_4$ is hydrogen, a $C_1$-$C_8$ alkyl, $C_1$-$C_4$ alkoxy, $C_2$-$C_4$ alkanoylamino, ureido, halogen or sulfo, $V_1$ is a radical of the formula:

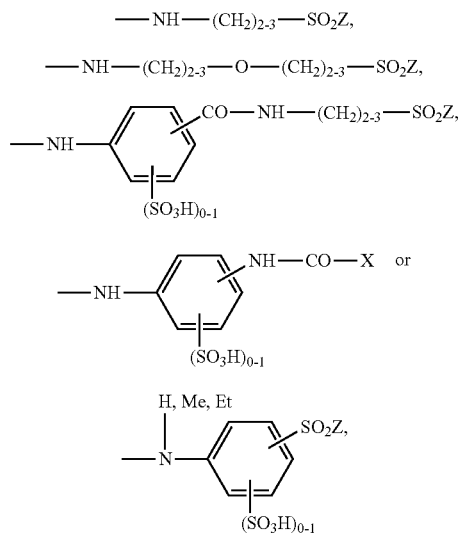

wherein Z is vinyl or a radical —$CH_2$—$CH_2$—U and U is a leaving group removable under alkaline conditions,
X is a radical of formula

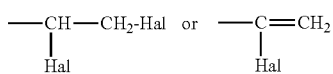

wherein Hal is a halogen, and $D_1$ is a radical of the formula:

$R_5$ and $R_6$ are each independently of the other hydrogen or a $C_1$-$C_8$ alkyl that is unsubstituted or substituted by a hydroxy, sulfo, sulfato, cyano, carboxy, $C_1$-$C_4$ alkoxy or phenyl, $D_2$ and $D_3$ are each independently of the other a radical of a formula:

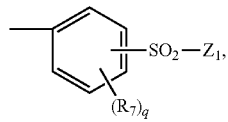

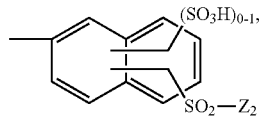

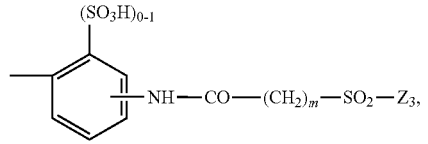

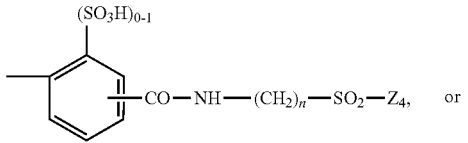

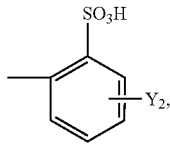

wherein $R_7$ denotes identical or differing substituents from the halogen group, $C_1$-$C_8$alkyl, $C_1$-$C_4$ alkoxy and sulfo, q is the number 0, 1 or 2, $Y_2$ is α,β-dibromopropionylamino or α-bromoacryloylamino, m is the number 2 or 3, n is the number 2 or 3, and $Z_1$, $Z_2$, $Z_3$ and $Z_4$ are each independently of the others vinyl, β-chloroethyl or β-sulfatoethyl, $R_8$ is a hydroxyl or —$NR_{12}R_{13}$, $R_9$ and $R_{10}$ are each independently of the other hydrogen or a $C_1$-$C_8$ alkyl that is unsubstituted or substituted by a hydroxy, sulfo, sulfato, cyano, carboxy, $C_1$-$C_4$ alkoxy or phenyl, $R_{11}$ is hydrogen, a $C_1$-$C_8$ alkyl, $C_1$-$C_4$ alkoxy or sulfo, $R_{12}$ and $R_{13}$ are each independently of the other hydrogen or a $C_1$-$C_8$ alkyl that is unsubstituted or substituted by a hydroxy, sulfo, sulfato, cyano, carboxy, $C_1$-$C_4$ alkoxy or phenyl, $V_2$ is —$SO_2Y_2$ or a radical of the formula (5a), (5b), (5c), (5d), or (5e), $Y_2$ is vinyl or a radical —$CH_2$—$CH_2$—U and U is a leaving group removable under alkaline conditions, r and s are each independently of the other the number 0 or 1, and t is the number 0, 1 or 2, and the sum of r, s and t is 2 or 3.

2. A dye mixture according to claim 1, comprising at least one dye of the formula:

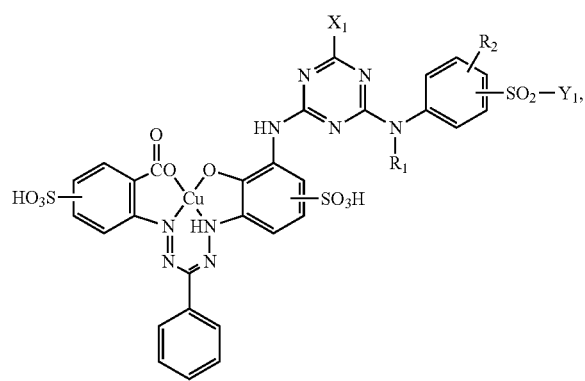

(1a)

wherein $R_1$, $R_2$, $X_1$ and $Y_1$ are as defined in claim 1.

3. A dye mixture according to claim 1, comprising at least one dye of the formula:

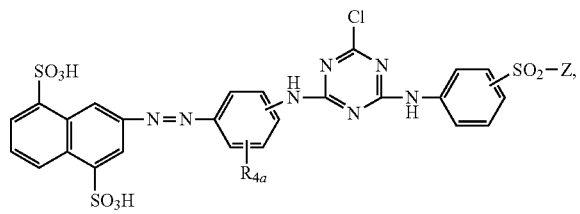

(2a)

in which $R_{4a}$ is hydrogen, a $C_1$-$C_8$ alkyl, $C_1$-$C_4$ alkoxy, $C_2$-$C_4$ alkanoylamino, ureido or halogen, and Z is as defined in claim 1.

4. A dye mixture according to claim 1, comprising at least one dye of formula (3a), wherein $D_2$ and $D_3$ are each a radical of formula (7e).

5. A dye mixture according to claim 1 comprising 20-80% by weight of a dye of formula (1) and 20-80% by weight of a dye of formula (2), (3a) or (3b).

6. A method for the dichromatic or trichromatic dyeing or printing of natural or synthetic polyamide fibre materials, which method comprises using at least one blue dyeing dye of formula (1) and at least one yellow or red dyeing dye selected from the group consisting of formulae (2), (3a) and (3b) as defined in claim 1.

7. A method for the dichromatic or trichromatic dyeing or printing of natural or synthetic polyamide fibre materials according to claim 6, wherein at least one dye of formula (1) is used together with at least one dye of formula (2) together with at least one dye of formula (3a).

8. An aqueous ink comprising a dye mixture according to claim 1.

* * * * *